US009801139B2

(12) United States Patent
Yuda et al.

(10) Patent No.: US 9,801,139 B2
(45) Date of Patent: Oct. 24, 2017

(54) WIRELESS COMMUNICATION DEVICE AND WIRELESS COMMUNICATION METHOD

(75) Inventors: Yasuaki Yuda, Kanagawa (JP); Seigo Nakao, Kanagawa (JP); Ayako Horiuchi, Kanagawa (JP); Akihiko Nishio, Kanagawa (JP); Daichi Imamura, Kanagawa (JP); Takashi Iwai, Ishikawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 1243 days.

(21) Appl. No.: 13/582,300

(22) PCT Filed: Mar. 16, 2011

(86) PCT No.: PCT/JP2011/001561
§ 371 (c)(1),
(2), (4) Date: Aug. 31, 2012

(87) PCT Pub. No.: WO2011/114729
PCT Pub. Date: Sep. 22, 2011

(65) Prior Publication Data
US 2012/0320820 A1 Dec. 20, 2012

(30) Foreign Application Priority Data
Mar. 19, 2010 (JP) ................. 2010-064928

(51) Int. Cl.
*H04W 52/14* (2009.01)
*H04W 52/46* (2009.01)
(Continued)

(52) U.S. Cl.
CPC ....... *H04W 52/146* (2013.01); *H04W 52/244* (2013.01); *H04W 52/46* (2013.01); *H04W 52/242* (2013.01); *H04W 52/362* (2013.01)

(58) Field of Classification Search
CPC .................................................. H04W 52/146
(Continued)

(56) References Cited

U.S. PATENT DOCUMENTS 8,285,320 B2 * 10/2012 Voyer ............................ 455/522
2008/0137562 A1 * 6/2008 Li et al. ........................ 370/280
(Continued)

FOREIGN PATENT DOCUMENTS

WO WO 2008128752 A1 * 10/2008
WO 2009/077863 A2 6/2009
WO WO 2009077863 A2 * 6/2009

OTHER PUBLICATIONS

Qualcomm Europe, Operation of Relays in LTE-A, 3GPP TSG-RAN WG1 #55bis, R1-090369, Jan. 2008 passages 2.3 to 2.4.
(Continued)

*Primary Examiner* — Jason Mattis
(74) *Attorney, Agent, or Firm* — Pearne & Gordon LLP

(57) ABSTRACT

A wireless communication device which can improve reception quality in a second other wireless communication device is disclosed, including a reception unit which receives a signal from a first other wireless communication device or a second other wireless communication device connected to the wireless communication device and the first other wireless communication device, a transmission power value setting unit which sets a transmission power value in a first subframe, in which the first other wireless communication device transmits a signal to the second other wireless communication device, to be higher than that in a second subframe in which the first other wireless communication device receives a signal from a third other wireless communication device connected to the first other wireless communication device, and a transmission power value switching control unit which performs switching in the first subframe to the transmission power value higher than that in the second subframe.

12 Claims, 17 Drawing Sheets

(51) Int. Cl.
H04W 52/24 (2009.01)
H04W 52/36 (2009.01)

(58) Field of Classification Search
USPC .......................................... 370/315
See application file for complete search history.

(56) References Cited

U.S. PATENT DOCUMENTS

| | | | |
|---|---|---|---|
| 2009/0053994 A1* | 2/2009 | Senarath et al. ............. | 455/11.1 |
| 2010/0309867 A1* | 12/2010 | Palanki ................ | H04L 5/0053 |
| | | | 370/329 |
| 2012/0087276 A1* | 4/2012 | Huang ................... | H04B 7/155 |
| | | | 370/253 |
| 2012/0282889 A1* | 11/2012 | Tanaka et al. ................ | 455/405 |

OTHER PUBLICATIONS

CATT,CMCC,Potevio, DL and UL Backhaul Subframe Allocation for Type I Relay in LTE-A, 3GPP TSG-RAN WG1 #57, R1-091989, May 2009, entire text, all drawings.
3GPP TR36.912 v9.0.0 (Sep. 2009).
3GPP TS36.213 v8.6.0 (Mar. 2009).
3GPP R1-100355 (Jan. 2010).
International Search Report for Application No. PCT/JP2011/001561 dated Apr. 12, 2011.

* cited by examiner

WIRELESS COMMUNICATION DEVICE AND WIRELESS COMMUNICATION METHOD

TECHNICAL FIELD

The present invention relates to a wireless communication device and a wireless communication method.

BACKGROUND ART

In 3GPP (3rd Generation Partnership Project) which is the international standardization organization for mobile communication, the standardization of LTE (Long Term Evolution) which is a 3.9-generation mobile communication system has been completed, and at present, the standardization of LTE-Advanced (LTE-A) which follows LTE is being advanced as a 4th generation mobile communication system. In LTE-A, as described in NPL 1, for the purposes of coverage expansion and capacity improvement, a Relay technique which relays a radio signal using a relay station (Relay Node) is being studied.

The Relay technique in LTE-A will be described simply with reference to FIG. 15. FIG. 15 shows a communication system using Relay. In FIG. 15, eNB represents a base station, RN represents a relay station, and UE represents a terminal. UE1 is a terminal which is connected to eNB, and UE2 is a terminal which is connected to RN.

In LTE-A, similarly to the eNB, a technique in which an individual cell ID is given to an RN is being studied. Accordingly, similarly to a cell (macrocell) which is formed by the eNB, the RN can form a single cell (Relay cell). In LTE-A, the Relay is called Type 1 Relay. An eNB is connected to a network through wired communication, and an RN is connected to the eNB through wireless communication. A communication link which connects between the RN and the eNB is called a backhaul link.

Meanwhile, a communication link which connects between the eNB and the UE and between the RN and the UE is called an access link. In a downlink, the RN receives a signal from the eNB in the backhaul link and transmits a signal to the UE2 in the access link of the RN. In an uplink, the RN receives a signal from the UE2 in the access link of the RN and transmits a signal to the eNB in the backhaul link.

In LTE-A, the Relay in which the backhaul link and the access link are stored in the same frequency band is called In-band Relay. In In-band Relay, if the RN performs transmission and reception at the same timing, since a transmission signal strays into a reception signal and interference occurs, the RN may not perform transmission and reception at the same timing. For this reason, in LTE-A, a Relay method in which the timing of the backhaul link and the access link of the RN are allocated in a subframe unit is being studied.

In LTE-A, as shown in FIG. 15, a system in which a Relay cell with a small area is arranged to overlap the area of a macrocell is being studied. Since the size of the area of the cell depends on the transmission power of the downlink this system, the RN performs transmission in the downlink at power lower than the transmission power in the downlink of the eNB. In this system, as one method of determining a connection cell of the UE, there is a method in which connection is made to a cell with the maximum downlink reception power in the UE.

In the uplink of the LTE, in order to reduce inter-cell interference, a method in which transmission is performed at the suppressed transmission power of the UE is selected. In LTE, the transmission power of a PUSCH (Physical Uplink Shared Channel) which is used for data transmission of the uplink is expressed by Expression (1) in NPL 2.

$$P_{PCSC}(i) = \min\{P_{MAX}, 10 \log_{10}(M(i)) + P_o(j) \cdot PL + \Delta_{TF}(i) + f(i)\}$$ [Equation 1]

In Expression (1), $P_o(j)$ is a reception target level, and $\alpha(j)$ is a coefficient which compensates for distance attenuation (path-loss) PL between the eNB and the UE measured in the UE, and is a parameter which is notified from the eNB to the UE in a RRC (Radio Resource Control) message. The RRC message is control information of a higher level layer than a PDCCH (Physical Downlink Control Channel) which is control information of a physical layer. The eNB sets $P_o(j)$ to be lower or sets $\alpha(j)$ to a value smaller than 1, thereby controlling the transmission power of the UE to be low.

In Expression (1), f(i) is a cumulative value of a TPC (Transmit Power Control) command which controls variation in a reception level with movement of the UE or the like. The TPC command is a parameter which is notified from the eNB to the UE in the PDCCH. In a single notification of the TPC command, transmission power can be controlled to any value of [−1, 0, 1, 3] [dB]. $P_{MAX}$ represents the maximum transmission power at which the UE can perform transmission, M represents a transmission bandwidth, $\Delta_{TF}(i)$ represents an offset relating to a transmission MCS (Modulation and Coding Scheme) set, represents a transmission subframe.

In the communication system using Relay shown in FIG. 15, a method of controlling uplink (Up Link; UL) transmission power is considered. In the communication system using Relay, even if a UE is closer to the RN than the eNB, since downlink reception power from the eNB is stronger than reception power from the RN due to a difference in downlink (Down Link; DL) transmission power between the eNB and the RN, there is a UE (UE1) which is connected to the eNB (hereinafter, a UE which is connected to the eNB is called a macrocell UE, and a UE which connected to the RN is called a Relay cell UE). In UE1, since the distance between eNB-UE1 is longer than the distance between RN-UE1, in regard to the path-loss (distance attenuation) depending on the distance, the path-loss between the eNB and the UE1 is larger than the path-loss between the RN and the UE1.

In the UE1, in order to obtain a desired uplink reception level in the eNB as a connection destination, it is necessary to transmit a signal at power which sufficiently compensates for the path-loss between eNB-UE1. The transmission power in this case is shown in FIG. 16. FIG. 16 is a diagram (first view) illustrating the transmission power of a plurality of terminals in an uplink. In FIG. 16, the vertical direction represents a power level, in which eNB and RN represent a reception level, and UE1 and UE2 represent a transmission level. The horizontal direction represents a distance. Similarly to FIG. 15, eNB represents a base station, RN represents a relay station, and UE represents a terminal. UE1 represents a terminal which is connected to eNB, and UE2 is a terminal which is connected to RN.

As shown in FIG. 16, since the distance between RN-UE2 is short, even if transmission is performed at a lower power than the UE1, the Relay cell UE (UE2) can obtain a desired reception level in the RN. However, in the RN, the reception power of a signal from the UE2 as a desired signal becomes higher than the reception power of a signal from the UE1 as an interference signal. If the macrocell and the Relay cell use the same band as the frequency band of the uplink, a signal from the macrocell UE (UE1) interferes with a signal from the Relay cell UE (UE2).

In regard to interference described with reference to FIG. 16, as studied in NPL 3, the macrocell UE (UE1) performs transmission at the suppressed transmission power, thereby suppressing interference with the Relay cell. The transmission power in this case is shown in FIG. 17. FIG. 17 is a diagram (second view) illustrating the transmission power of a plurality of terminals in an uplink In FIG. 17, the vertical direction represents a power level, eNB and RN represent a reception level, and UE1 and UE2 represent a transmission level. The horizontal direction represents a distance. Similarly to FIG. 15, eNB represents a base station, RN represents a relay station, and UE represents a terminal. UE1 is a terminal which is connected to eNB, and UE2 is a terminal which is connected to RN.

CITATION LIST

Non Patent Literature

NPL 1: "3GPP TR36.912 v9.0.0 (2009-09)"
NPL 2: "3GPP TS36.213 v8.6.0 (2009-03)"
NPL 3: "3GPP R1-100355 (2010-01)"

SUMMARY OF INVENTION

Technical Problem

As shown in FIG. 17, in order to suppress signal power from the UE1 in the RN, transmission is performed at the suppressed transmission power of the UE1. This is because only a part of the path-loss between the eNB and the UE1 may be compensated for at the transmission power of the UE1. A method of suppressing transmission power in the macrocell UE can be realized by controlling the parameter for suppressing transmission power in Expression (1). For example, it is considered that the reception target level $P_o(j)$ in Expression (1) is set to a low value. The value of the compensation coefficient $\alpha(j)$ is set to a value smaller than 1.

However, as described with reference to FIG. 17, although the uplink transmission power in the macrocell UE is suppressed, thereby suppressing interference with the Relay cell, there is a problem in that the reception power of the uplink of the macrocell UE in the eNB is suppressed, resulting in low reception quality.

An object of the invention is to provide a wireless communication device and a wireless communication method which can increase the transmission power of a wireless communication device which is connected to a second other wireless communication device in a subframe in which a first other wireless communication device transmits a signal to the second other wireless communication device, thereby improving reception quality.

Solution to Problem

A wireless communication device of the present invention comprises:
a reception unit configured to receive a signal from a first other wireless communication device or a second other wireless communication device to which the wireless communication device and the first other wireless communication device are connected;

a transmission power value setting unit configured to set a transmission power value in a first subframe, in which the first other wireless communication device transmits a signal to the second other wireless communication device, to be higher than a transmission power value in a second subframe in which the first other wireless communication device receives a signal from a third other wireless communication device connected to the first other wireless communication device; and a transmission power value switching control unit configured to, in the first subframe, perform switching to the transmission power value higher than the transmission power value in the second subframe on the basis of the setting in the transmission power value setting unit.

In the above mentioned wireless communication device, the transmission power value setting unit sets a first transmission power value which is the transmission power value higher than the transmission power value in the second subframe and sets a second transmission power value which is the transmission power value in the second subframe, and the transmission power value switching control unit performs switching to the first transmission power value in the first subframe and switching to the second transmission power value in a subframe other than the first subframe.

In the above mentioned wireless communication device, the reception unit receives an indicator indicating whether or not the first subframe is reached from the second other wireless communication device, and the transmission power value switching control unit performs switching to the first transmission power value in the first subframe and switching to the second transmission power value in a subframe other than the first subframe on the basis of the indicator.

In the above mentioned wireless communication device, the transmission power value switching control unit performs switching to the first transmission power value in the first subframe as the distance between the first other wireless communication device and the wireless communication device is short.

The above mentioned wireless communication device may further comprise:

a path-loss measurement unit configured to measure a path-loss between the second other wireless communication device and the wireless communication device on the basis of a reference signal transmitted from the second other wireless communication device and a path-loss between the first other wireless communication device and the wireless communication device on the basis of a reference signal transmitted from the first other wireless communication device; and a transmission unit configured to transmit the measurement result of the path-loss measurement unit to the second other wireless communication device, wherein, if the reception unit receives, from the second other wireless communication device, the determination result determined by the second other wireless communication device on whether or not the distance between the first other wireless communication device and the wireless communication device is short on the basis of the measurement result of the path-loss measurement unit, the transmission power value switching control unit performs switching to the first transmission power value in the first subframe and switching to the second transmission power value in a subframe other than the first subframe, on the basis of the determination result received from the second other wireless communication device.

In the above mentioned wireless communication device, the reception unit receives a bitmap indicating the timing of the first subframe from the second other wireless communication device, and the transmission power value switching control unit performs switching to the first transmission power value in the first subframe and switching to the second transmission power value in a subframe other than the first subframe on the basis of the bitmap.

The above mentioned wireless communication device may further comprise:

a subframe detection unit which detects the first subframe, wherein the transmission power value switching control unit performs switching to the first transmission power value in the first subframe and switching to the second transmission power value in a subframe other than the first subframe on the basis of the detection result of the subframe detection unit.

A wireless communication method of the present invention in a wireless communication device includes:

receiving a signal from a first other wireless communication device or a second other wireless communication device to which the wireless communication device and the first other wireless communication device are connected;

setting a transmission power value in a first subframe, in which the first other wireless communication device transmits a signal to the second other wireless communication device, to be higher than a transmission power value in a second subframe in which the first other wireless communication device receives a signal from a third other wireless communication device which is connected to the first other wireless communication device; and performs switching, in the first subframe, to the power value higher than the transmission power value in the second subframe on the basis of the setting in the transmission power value.

Advantageous Effects of Invention

According to the wireless communication device and the wireless communication method of the invention, in a subframe in which a first other wireless communication device transmits a signal to a second other wireless communication device, a signal can be transmitted to the second other wireless communication device at a transmission power higher than a transmission power value in a second subframe in which the first other wireless communication device receives a signal from a third other wireless communication device which is connected to the first other wireless communication device, thereby improving reception quality in the second other wireless communication device.

DESCRIPTION OF EMBODIMENTS

Figure 1:
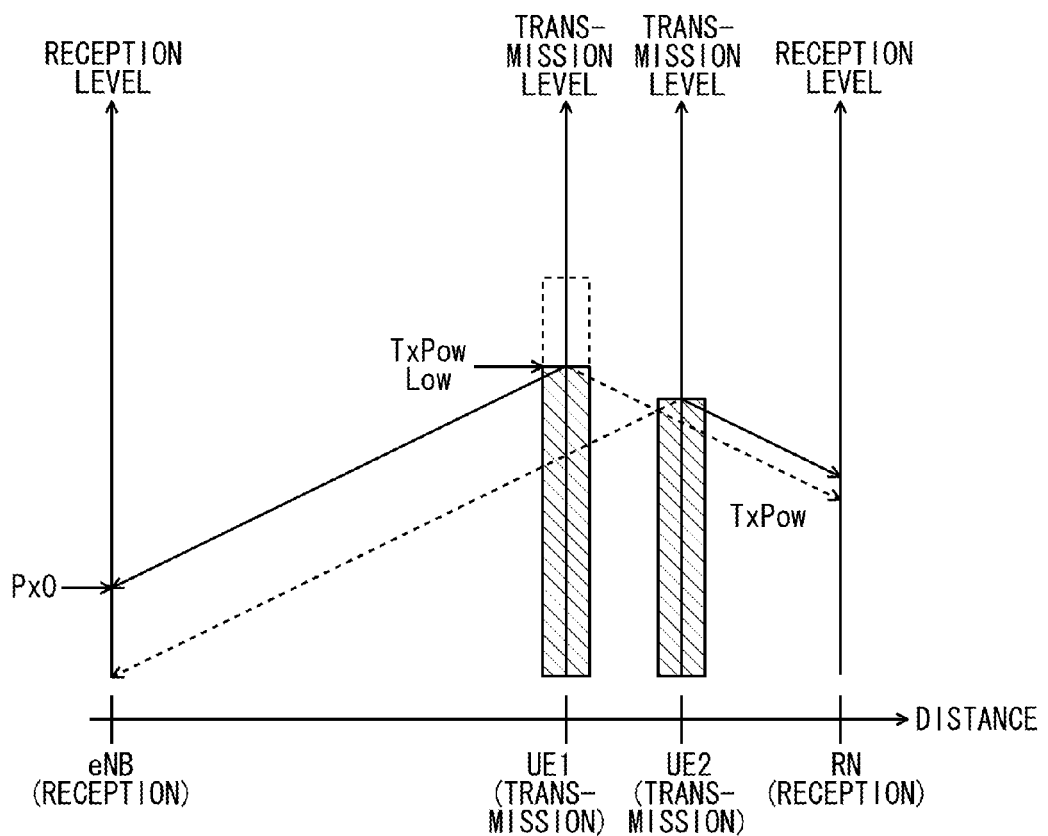
FIG. 1 is a diagram showing transmission power in a subframe other than an "RN uplink backhaul subframe".

Hereinafter, embodiments of the invention will be described with reference to the drawings.

First Embodiment

In Relay which is being studied in LTE-A, in a relay station (hereinafter, referred to as RN), a method in which a backhaul link and an access link are allocated in each subframe is being studied. In an uplink backhaul subframe of an RN, the RN transmits a signal to a base station (hereinafter, referred to as eNB), and in an access subframe of the RN, the RN receives a signal from a terminal (UE) of a Relay cell. The UE of the Relay cell refers to a UE which is connected to the RN in the Relay cell.

In the RN uplink backhaul subframe, the RN transmits a signal to the eNB, and does not receive a signal from the UE of the Relay cell. For this reason, in the RN uplink backhaul subframe, although a UE (hereinafter, referred to as a macrocell UE) which is connected to a macrocell (for example, a base station cell) performs transmission at high power, there is no interference with the Relay cell. That is, at the timing of the RN uplink backhaul subframe, if the macrocell UE (Macro cell UE) transmits a signal at high power, the macrocell UE can increase reception power in the eNB without causing interference in the Relay cell. For this reason, it is possible to improve reception quality in the eNB. Accordingly, at the timing of the RN uplink backhaul subframe, the macrocell UE can use MCS (Modulation and Coding Scheme) which allows transmission of a larger amount of data, thereby improving throughput.

Accordingly, in a first embodiment of the invention, in the macrocell UE, two transmission power values of "high transmission power" and "low transmission power" are set, and the macrocell UE switches the transmission power values depending on whether or not the uplink backhaul subframe of the relay station (hereinafter, referred to as RN) is reached.

In this embodiment, the macrocell UE refers to a wireless communication terminal device 100 (User Equipment: UE) which is connected to a base station 200 (hereinafter, referred to as eNB). In this embodiment, a wireless communication terminal device which is connected to the RN is a wireless communication terminal device 300. Hereinafter, for description, in order to distinguish between both wireless communication terminal devices, the wireless communication terminal device 100 (User Equipment: UE) is referred to as UE1, and the wireless communication terminal device 300 is referred to as UE2.

The "high transmission power" is transmission power at which reception power in the eNB can satisfy desired quality of the eNB. The "low transmission power" is transmission power which is suppressed compared to the high transmission power value so as to suppress interference. In regard to the degree of compensation of a path-loss at the transmission power, a path-loss can be sufficiently compensated for at the "high transmission power", and a part of a path-loss can be compensated for at the "low transmission power".

Figure 2:
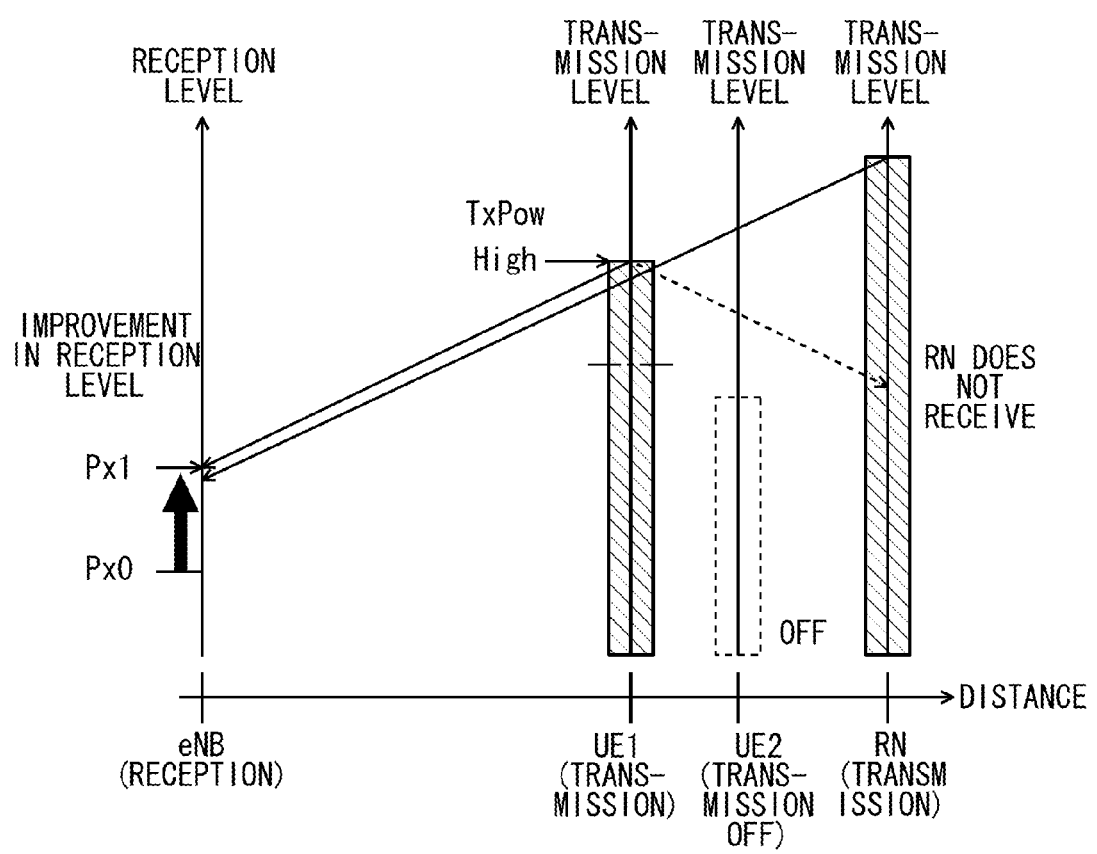
FIG. 2 is a diagram showing transmission power in an "RN uplink backhaul subframe".

For example, description will be provided with reference to FIGS. 1 and 2. FIG. 1 shows the transmission power of the macrocell UE (UE1) in a subframe other than the RN uplink backhaul subframe. FIG. 2 shows the transmission power of the macrocell UE (UE1) in a subframe which is the RN uplink backhaul subframe. In FIG. 1 or 2, the vertical axis represents a transmission or reception power level. The vertical axis of eNB and RN represents a reception level, and the vertical axis of UE1 and UE2 represents a transmission level. In FIG. 1 or 2, the horizontal axis represents a distance.

As shown in FIG. 1, in an access link subframe of an uplink, the RN receives a signal from the UE2. For this reason, in order to suppress interference with the Relay cell, the UE1 transmits an uplink signal to the eNB at "low transmission power (in the drawing, TxPow Low)". It is assumed that the reception power of a signal from the UE1 in the eNB is P0.

As shown in FIG. 2, in the "RN uplink backhaul subframe", the UE1 transmits an uplink signal to the eNB at "high transmission power (in the drawing, TxPow High)". In this subframe, since the UE2 which is connected to the RN does not transmit the uplink signal to the RN (in the drawing, described as OFF), the uplink signal transmitted from the UE1 does not interfere with the Relay cell.

In FIG. 2, in the RN uplink backhaul subframe, while the RN transmits a signal to the eNB, the uplink signal which is transmitted from the UE1 to the eNB and the uplink signal (backhaul) which is transmitted from the RN to the eNB are allocated to different resources (time resource and/or frequency resource) by a scheduler of the eNB. Accordingly, the uplink signal which is transmitted from the UE1 to the eNB and the uplink signal which is transmitted from the RN to the eNB do not interfere with each other.

If the reception power of a signal from the UE1 in the eNB at this time is P1, reception power becomes higher than P0, thereby improving reception quality. In the RN uplink backhaul subframe, reception quality in the eNB is improved, the UE1 can perform transmission using MCS which allows transmission of a larger amount of data.

As an example which realizes the method described with reference to FIGS. 1 and 2, there is a method in which the eNB notifies the UE1 of information relating to the backhaul subframe, and the UE1 switches transmission power depending on information relating to the backhaul subframe.

For example, each time control information (UL grant) including uplink MCS or allocation information is notified to the UE1, at the timing (for example, a subframe) at which the uplink is transmitted, the eNB also notifies backhaul indicator (hereinafter, simply referred to as indicator) indicating whether or not the RN uplink backhaul subframe is reached. A method of giving notification of an indicator can be easily realized. This is because the eNB should allocate to the RN backhaul of the uplink to be transmitted from the RN, and thus the eNB knows the timing of the uplink backhaul subframe of the Relay cell.

The UE1 switches and transmits uplink transmission signals on the basis of the indicator included in the uplink control information notified from the eNB.

[Operation Flow]

Figure 3:
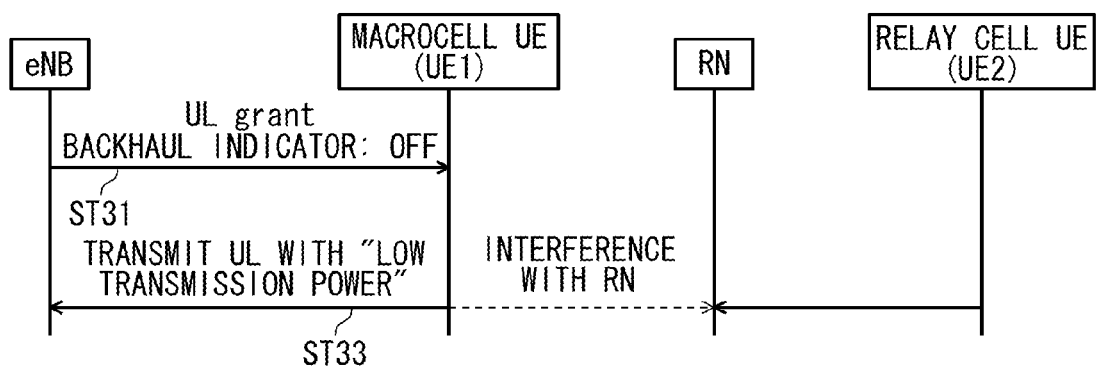
FIG. 3 shows an operation flow in a subframe other than an "RN uplink backhaul subframe".
Figure 4:
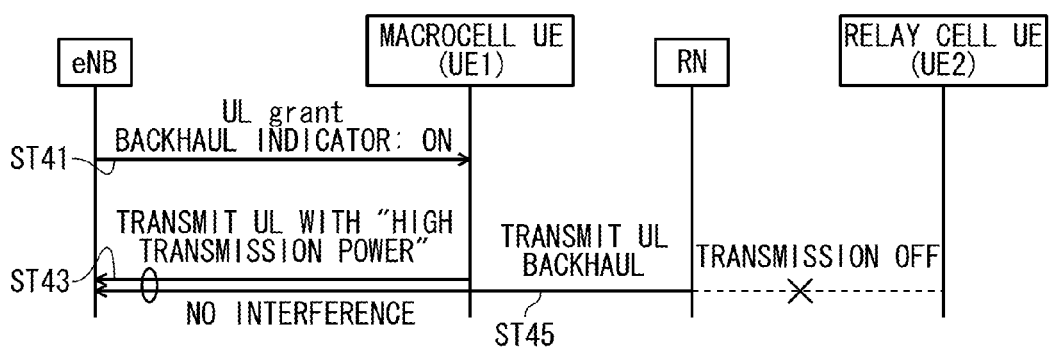
FIG. 4 shows an operation flow in an "RN uplink backhaul subframe".

Next, the operation flow of the communication system of Embodiment 1 will be described with reference to FIGS. 3 and 4. FIG. 3 shows an operation flow when the UE1 transmits an uplink signal in a subframe other than the "RN uplink backhaul subframe". FIG. 4 shows an operation flow when the UE1 transmits an uplink signal in an "RN uplink backhaul subframe".

In the operation flows shown in FIGS. 3 and 4, it is assumed that the indicator is ON in the "RN uplink backhaul subframe". Accordingly, if the indicator is ON, the macrocell UE (UE1) transmits the uplink at "high transmission power", and if the indicator is OFF, the macrocell UE (UE1) transmits the uplink at "low transmission power".

In the situation shown in FIG. 3, the eNB notifies the indicator (OFF) simultaneously with the uplink control information (UL grant) (Step ST31). The macrocell UE (UE1) transmits the uplink signal "low transmission power" on the basis of the notified indicator (OFF) (Step ST33). In the situation shown in FIG. 3, the uplink signal transmitted from the macrocell UE (UE1) interferes with the uplink signal transmitted from the Relay cell UE (UE2) in the RN.

In the situation shown in FIG. 4, the eNB notifies the indicator ON simultaneously with the uplink control information (UL grant) (Step ST41). The macrocell UE (UE1) transmits the uplink signal at "high transmission power" on the basis of the notified indicator (ON) (Step ST42). In the situation shown in FIG. 4, the RN does not perform reception. Accordingly, the uplink signal transmitted from the macrocell UE (UE1) does not undergo interference in the RN. The RN transmits a signal to the eNB in the uplink backhaul subframe (Step S45). However, the uplink signal transmitted from the macrocell UE (UE1) and the uplink signal transmitted from the RN in the backhaul subframe of the RN are allocated to different resources (time resource and/or frequency resource) by the scheduler of the eNB, and thus do not interfere with each other.

[Method of Setting Transmission Power Value]

Next, a method of setting two transmission power values of the macrocell UE (UE1) will be described. The two transmission power values are the transmission power values of "high transmission power" and "low transmission power" described above. For example, there is the following setting method (A). In LTE, the transmission power value of the uplink is determined by Expression (1). The UE1 sets a transmission power value derived by Expression (1) as a transmission power value Ptx1 in a subframe other than the backhaul subframe. In the backhaul subframe, a transmission power value P is notified from the eNB to the UE1, and the UE1 sets the transmission power value P as a transmission power value Ptx2 in the backhaul subframe.

In regard to the transmission power value P which is notified from the eNB to the UE1, Ptx2 may be notified directly or a difference from Ptx1 may be notified. At this time, if the UE notifies a path-loss between the eNB and the UE and a path-loss between the RN and the UE to the eNB, the eNB can control Ptx2 with high precision.

A transmission power value in the backhaul subframe may be set as Ptx2, and a transmission power value in a subframe other than the backhaul subframe may be set as Ptx1.

As a method (B) of setting two transmission power values of the UE1, there is a method in which the UE itself calculates two transmission power values. For example, the UE measures a path-loss between the eNB and the UE and a path-loss between the RN and the UE, and defines a calculation expression or a table for calculating the transmission power values from the measurement result of the path-loss in advance. The transmission power value Ptx2 can be calculated on the basis of the measured path-loss information.

As a method (C) of setting two transmission power values of the UE1, there is a method which is realized by adding parameters in Expression (1). For example, in Expression (1), a parameter whose offset amount changes depending on the backhaul indicator is further provided. In regard to this parameter, it is assumed that, when the backhaul indicator is OFF, the offset amount "0", and when the backhaul indicator is ON, the offset amount is "ΔP". At this time, ΔP may be a value which is notified from the eNB or may be a value which is calculated by the UE itself, as described above.

As a method (D) of setting two transmission power values of the UE, there is a method which is realized using an expression different from Expression (1). For example, Expression (1) is applied in a subframe other than the backhaul subframe, and an expression which is applied in the backhaul subframe is defined separately. The expressions to be applied are switched depending on the backhaul indicator. Expression (1) may be applied in the backhaul subframe, and an expression which is applied in a subframe other than the backhaul subframe may be defined separately.

As a method (E) of setting two transmission power values of the UE, there is a method in which the parameter in Expression (1) has two values, and the values are switched depending on the backhaul indicator. For example, in regard to the reception target level $P_o(j)$ in Expression (1), a high value $P_{o\_high}$ and a low value $P_{o\_low}$ are set, $P_{o\_high}$ is applied in the backhaul subframe, and $P_{o\_low}$ is applied in a subframe other than backhaul subframe. The compensation coefficient $\alpha(j)$ in Expression (1) may be used.

As described above, in this embodiment, the macrocell UE (UE1) can increase the transmission power of the uplink of the macrocell UE in the "RN uplink backhaul subframe" without causing interference with the Relay cell, thereby increasing reception power in the eNB. For this reason, reception quality in the eNB is improved, thereby improving an error rate.

In this embodiment, the macrocell UE (UE1) can transmit a signal using high MCS, thereby improving throughput of the macrocell UE (UE1). It is also possible to improve system throughput in the macrocell. In an environment which the ratio of uplink backhaul subframes is high, the throughput improvement effect can be significantly obtained.

The backhaul indicator may be notified in the uplink control information (UL grant) or may be notified in a different format.

In this embodiment, in the "RN uplink backhaul subframe", the macrocell UE (UE1) switches transmission power between "high transmission power" and "low transmission power" described above. Along with switching of transmission power, the MCS of transmission data may be changed. For example, in the "RN uplink backhaul subframe", when the macrocell UE performs transmission at high transmission power, the macrocell UE performs transmission with high MCS of data. At this time, the relationship between variation in transmission power and the variation in MCS is defined in advance, thereby changing MCS depending on variation in transmission power.

A method in which variation is notified from the eNB may be used. Accordingly, even when the uplink control information is not notified every time, with notification of only the backhaul indicator, the macrocell UE can perform transmission with high MCS in the RN uplink backhaul subframe, thereby improving throughput.

Although in this embodiment, description has been provided focusing on the macrocell UE (UE1), the invention is not limited thereto. For example, when a Relay cell A and a Relay cell B are adjacent to each other, in the vicinity of the cell boundary between the Relay cell A and the Relay cell B, a Relay cell UE which is connected to one Relay cell may be used. In this case, in the other Relay cell, if transmission power is switched in an uplink backhaul subframe, the same effects as in this embodiment can be obtained.

Although in this embodiment, the set transmission power values are switched depending on the backhaul indicator, the meaning of information notified by another kind of control information may be replaced depending on the backhaul indicator. For example, in a TPC command which is notified as control information to the uplink, while any one value of [+3, +1, 0, 1] [dB] is notified, there is a method in which the value of the TPC command is replaced depending on the backhaul indicator. If the TPC command notifies any one of [+3, +1, 0, 1] [dB] when the backhaul indicator is OFF, and the TPC command notifies any one of [+15, +10, +5, +3] [dB] when the backhaul indicator is ON, the TPC command is replaced. When the backhaul indicator is ON, the power values notified by the TPC command are increased, and a signal is transmitted. Accordingly, it is possible to select multiple transmission power values to be increased, thereby controlling the transmission power values more flexibly.

Although in this embodiment, a method in which the backhaul link and the access link in the RN are allocated in a subframe unit has been described, the invention is not limited thereto. For example, even if a unit of a signal in a time direction in a communication system to which Relay is applied, for example, a frame unit, a slot unit, or the like is used instead of a subframe unit, the same effects as in this embodiment can be obtained.

In this embodiment, in the "RN uplink backhaul subframe", the macrocell UE (UE1) switches transmission power between "high transmission power" and "low transmission power" described above. In a subframe in which the same operation as the operation of the Relay cell is performed in the "RN uplink backhaul subframe", this embodiment may be applied. In the "RN uplink backhaul subframe", the Relay cell UE (UE2) does not transmit an uplink signal to the RN. As a subframe in which this operation is performed, for example, when the number of Relay cells UE (UE2) is small and the uplink traffic amount is small, a subframe in which the RN does not perform uplink allocation of the Relay cell UE (UE2), the Relay cell UE (UE2) does not transmit an uplink signal is considered. When setting in the communication system, a subframe in which no setting is made in the RN uplink backhaul subframe and the RN uplink access subframe, the Relay cell UE (UE2) does not transmit an uplink signal is considered. In these subframes, this embodiment is applied, thereby obtaining the same effects.

Figure 5:
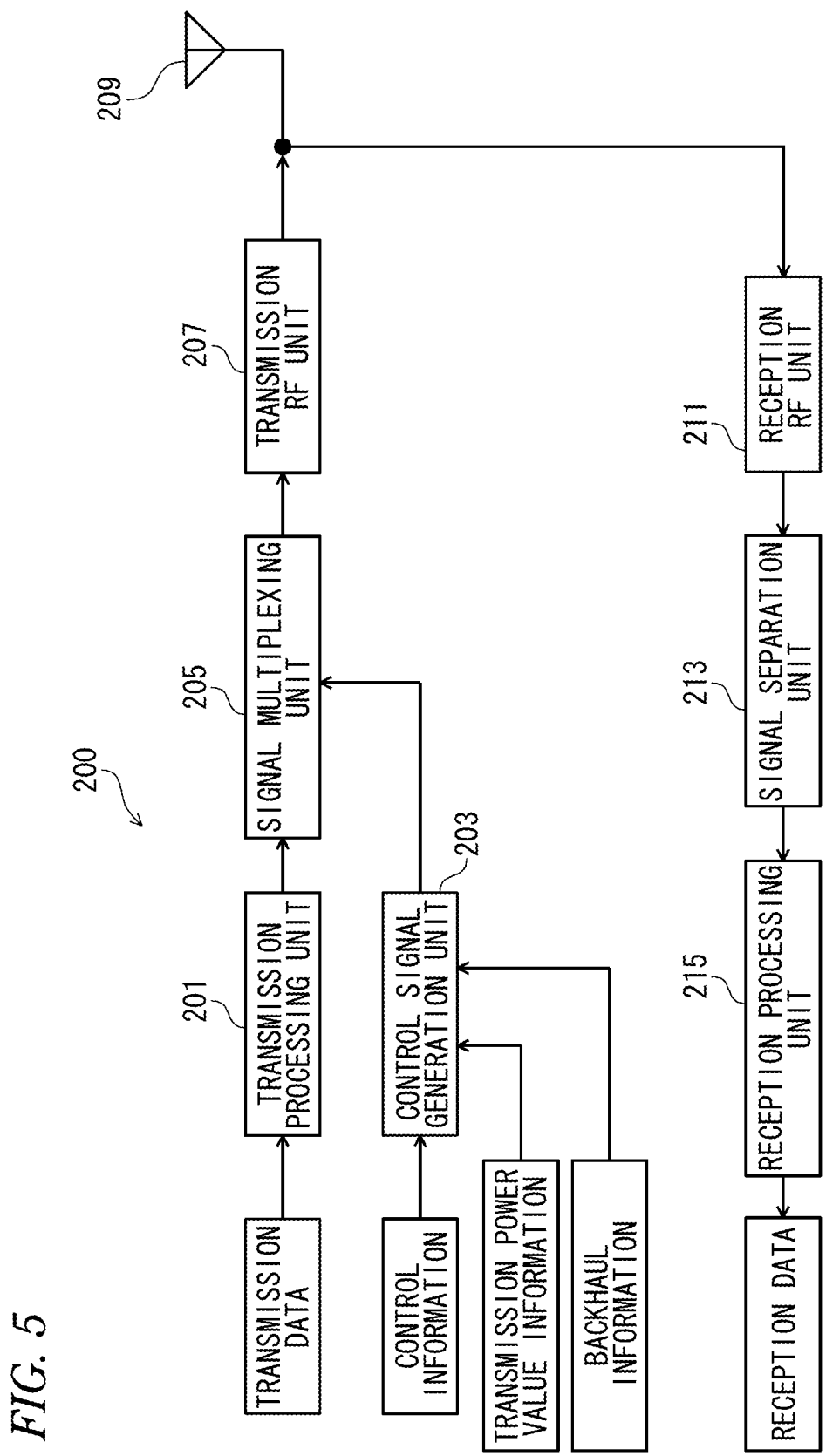
FIG. 5 is a block diagram showing the configuration of a base station device 200.

Next, a base station device (eNB) 200 and a wireless communication terminal device (UE1) 100 connected to the base station device (eNB) 200 which constitute a part of the communication system of this embodiment will be described with reference to FIGS. 5 and 6.

<Block Diagram: Base Station Device 200>

The configuration of the base station device (eNB) 200 which constitutes a part of the communication system of this embodiment will be described with reference to FIG. 5. FIG. 5 is a block diagram showing the configuration of the base station device 200. The base station device 200 shown in FIG. 5 includes a transmission processing unit 201, a control signal generation unit 203, a signal multiplexing unit 205, a transmission RF unit 207, a reception RF unit 211, a signal separation unit 213, a reception processing unit 215, and an antenna 209.

Transmission data is data which transmitted to each wireless communication terminal device in a downlink, and is input to the transmission processing unit 201.

The transmission processing unit 201 performs transmission processing, such as error correction coding and modulation, on transmission data. A signal subjected to the transmission processing is output to the signal multiplexing unit 205.

Control information includes control information (MCS information, resource allocation information, or the like) relating to transmission data of the downlink, control information (MCS information, resource allocation information, or the like) relating to data to be transmitted from a terminal in an uplink, and control information relating to a cell. The control information is input to the control signal generation unit 203.

Transmission power value information is information relating to transmission power values which are used in a backhaul subframe and other subframes in the wireless communication terminal device 100. The transmission power value information is input to the control signal generation unit 203.

The information relating to the transmission power value which is used in the backhaul subframe in the wireless communication terminal device 100 is information relating to the transmission power value of "high transmission power" described above. The information relating to the transmission power value which is used in a subframe other than the backhaul subframe in the wireless communication terminal device 100 is information relating the transmission power value of "low transmission power" described above.

Backhaul information is information relating to the timing of the "RN uplink backhaul subframe", and is input to the control signal generation unit 203.

The control signal generation unit 203 generates a control signal to be transmitted from the wireless communication device in the downlink from the control information, the transmission power value information, the backhaul information, and the like The generated control signal is output to the signal multiplexing unit 205.

The signal multiplexing unit 205 arranges the signal subjected to the transmission processing in the transmission processing unit 201, the control signal generated by the control signal generation unit 203, a reference signal (not shown), and the like in resources which transmit the signals, thereby multiplexing these signals. The multiplexed transmission signal is input to the transmission RF unit 207. As the resources in which the respective signals are arranged, time resources, frequency resources, and a combination of time and frequency resources are considered.

The transmission RF unit 207 performs RF processing, such as frequency conversion, power amplification, and filtering, on the transmission signals multiplexed by the signal multiplexing unit 205. The transmission signal subjected to the RF processing is transmitted from the antenna 209 toward the wireless communication terminal device 100.

The reception RF unit 211 performs RF processing, such as frequency conversion, power amplification, and filtering, on the signal received by the antenna 209 from the wireless communication terminal device 100. The reception signal subjected to the RF processing is input to the signal separation unit 213.

The signal separation unit 213 separates the reception signal subjected to the RF processing into data, the control signal, the reference signal, and the like. The separated reception data and reference signal are input to the reception processing unit 215.

The reception processing unit 215 performs channel estimation processing using the reference signal separated by the signal separation unit 213, and performs reception processing, such as demodulation and decoding, on the separated reception data using the channel estimation value. Data subjected to the reception processing becomes reception data.

<Block Diagram: Wireless Communication Terminal Device 100>

The configuration of the wireless communication terminal device 100 which constitutes a part of the communication system of this embodiment will be described with reference to FIGS. 6 and 7. FIG. 6 is a block diagram showing the configuration of the wireless communication terminal device 100. FIG. 7 is a diagram showing a specific configuration example of the transmission power value switching control unit 119. The wireless communication terminal device 100 shown in FIG. 6 includes an antenna 101, a reception RF unit 103, a signal separation unit 105, a reception processing unit 107, a control information extraction unit 109, a transmission power value setting unit 111, a transmission processing unit 113, a signal multiplexing unit 115, a transmission power value switching control unit 119, and a transmission RF unit 131.

The reception RF unit 103 performs reception RF processing, such as filtering for removing a signal outside a communication band, frequency conversion to an IF frequency band or a baseband, and power amplification, on a signal received by the antenna 101. The reception signal subjected to the RF processing is output to the signal separation unit 105.

The signal separation unit 105 separates the reception signal subjected to the RF processing into data, the control signal, and the reference signal. The separated reception data and reference signal are output to the reception processing unit 107, and the control signal output to the control information extraction unit 109.

The reception processing unit 107 performs channel estimation processing using the reference signal separated by the signal separation unit 105, and performs reception processing, such as demodulation and decoding, on the separated reception data using the channel estimation value. Data subjected to the reception processing becomes reception data.

The control information extraction unit 109 performs reception processing on the control signal separated by the signal separation unit 105, and extracts control information, such as control information relating to data received in the downlink, control information relating to data to be transmitted in the uplink, control information relating to the cell, transmission power value information in the wireless communication device, and information relating to the timing of the "RN uplink backhaul subframe".

Of the control information extracted by the control information extraction unit 109, the transmission power value information output to the transmission power value setting unit 111, and the uplink backhaul subframe timing information is output to the transmission power value switching control unit 119. The control information relating to reception data of the downlink is output to the reception processing unit 107, and the control information relating to transmission data of the uplink is output to the transmission processing unit 113.

The transmission power value setting unit 111 sets transmission power values, which are switched and controlled in the transmission power value switching control unit 119, on the basis of the transmission power value information extracted in the control information extraction unit 109. The transmission power values which are switched and controlled in the transmission power value switching control unit 119 are two transmission power values of the transmission power value of "high transmission power" and the transmission power value of "low transmission power" described above.

Transmission data is data which is transmitted from the wireless communication device to the base station device 200 in the uplink.

The transmission processing unit 113 performs transmission processing, such as coding, on transmission data on the basis of the control information relating to transmission data of the uplink extracted by the control information extraction unit 109. A signal subjected to the transmission processing is output to the signal multiplexing unit 115.

The signal multiplexing unit 115 arranges the signal subjected to the transmission processing in the transmission processing unit 113, the reference signal (not shown), and the like in resources which transmit the signals, thereby multiplexing the signals. As the resources in which the signals are arranged, for example, time resources, frequency resources, and a combination of time and frequency resources are considered. The multiplexed transmission signal output to the transmission power value switching control unit 119.

The transmission power value switching control unit 119 switches the transmission power of the transmission signal on the basis of the timing information of the "RN uplink backhaul subframe" extracted by the control information extraction unit 109. If the timing of "RN uplink backhaul subframe" is reached, transmission is performed at "high transmission power" described above. If a subframe other than the "RN uplink backhaul subframe" is reached, transmission is performed at "low transmission power" described above.

A specific configuration example of the transmission power value switching control unit 119 will be described with reference to FIG. 7. FIG. 7 is a diagram showing a specific configuration example of the transmission power value switching control unit 119. The transmission power value switching control unit 119 shown in FIG. 7 includes a switch 121, an amplifier 123, and an amplifier 125.

The switches 121 and 127 perform switching between the two amplifiers 123 and 125, which perform power amplification of the transmission signal, on the basis of the timing information of the "RN uplink backhaul subframe" extracted in the control information extraction unit 109. If the timing of the "RN uplink backhaul subframe" is reached, the switches 121 and 127 perform switching to the amplifier 123 which is used for transmission at "high transmission power" described above. If a subframe other than the "RN uplink backhaul subframe" is reached, the switches 121 and 127 perform switching to the amplifier 125 which is used for transmission at "low transmission power" described above.

The amplifier 123 and the amplifier 125 amplify the power of the transmission signal output from the signal multiplexing unit 115 on the basis of an amplification factor instructed from the transmission power value setting unit 111. A signal which is power-amplified by the transmission power value switching control unit 119 is input to the transmission RF unit 131.

The transmission RF unit 131 performs RF processing, such as frequency conversion and filtering, on the transmission signal power-amplified by the transmission power value switching control unit 119. The transmission signal subjected to the RF processing is transmitted from the antenna 101 toward the base station device 200.

Second Embodiment

In a wireless communication terminal device (hereinafter, referred to as macrocell UE) which is connected to a base station (hereinafter, referred to as eNB), the magnitude of interference which occurs in a Relay cell differs due to the distance from the macrocell UE to the eNB and the distance from the macrocell UE to a relay station (hereinafter, referred to as RN).

For example, in a macrocell UE which is close to the eNB and away from the RN, a path-loss between the eNB and the macrocell UE is small. For this reason, even if the macrocell UE transmits an uplink signal at power which sufficiently compensates for the path-loss between the eNB and the macrocell UE, the path-loss between the RN and the macrocell UE is large. Accordingly, a signal which is transmitted from the macrocell UE little interferes with the Relay cell.

In regard to a macrocell UE which is away from the eNB and close to the RN, if an uplink signal is transmitted from the macrocell UE, this causes significant interference with the Relay cell. In this case, in the same macrocell UE, there are a case where significant interference with the Relay cell occurs and a case where little interference occurs.

Accordingly, in a macrocell UE which is close to the RN, two transmission power values of "high transmission power" and "low transmission power" are set, and if the macrocell UE which is close to the RN performs switching between the transmission power values depending on whether or not the "RN uplink backhaul subframe" is reached, it is possible to increase transmission power to the eNB and to significantly improve reception quality.

Accordingly, in the communication system according to Embodiment 2 of the invention, in particular, the two transmission power values of "high transmission power" and "low transmission power" are set for a wireless communication terminal device 500 (macrocell UE) which is close to the relay station (RN) and is connected to a base station 400, the macrocell UE which is away from the eNB and close to the RN performs switching between the transmission power values depending on whether or not the "RN uplink backhaul subframe" is reached.

The "high transmission power" is transmission power at which reception power in the eNB can satisfy desired quality of the eNB. The "low transmission power" is transmission power which is suppressed compared to the above-described high transmission power value so as to suppress interference. In regard to the degree of compensation of a path-loss at the transmission power, a path-loss can be sufficiently compensated for at the "high transmission power", and a part of a path-loss can be compensated for at the "low transmission power".

Figure 8:
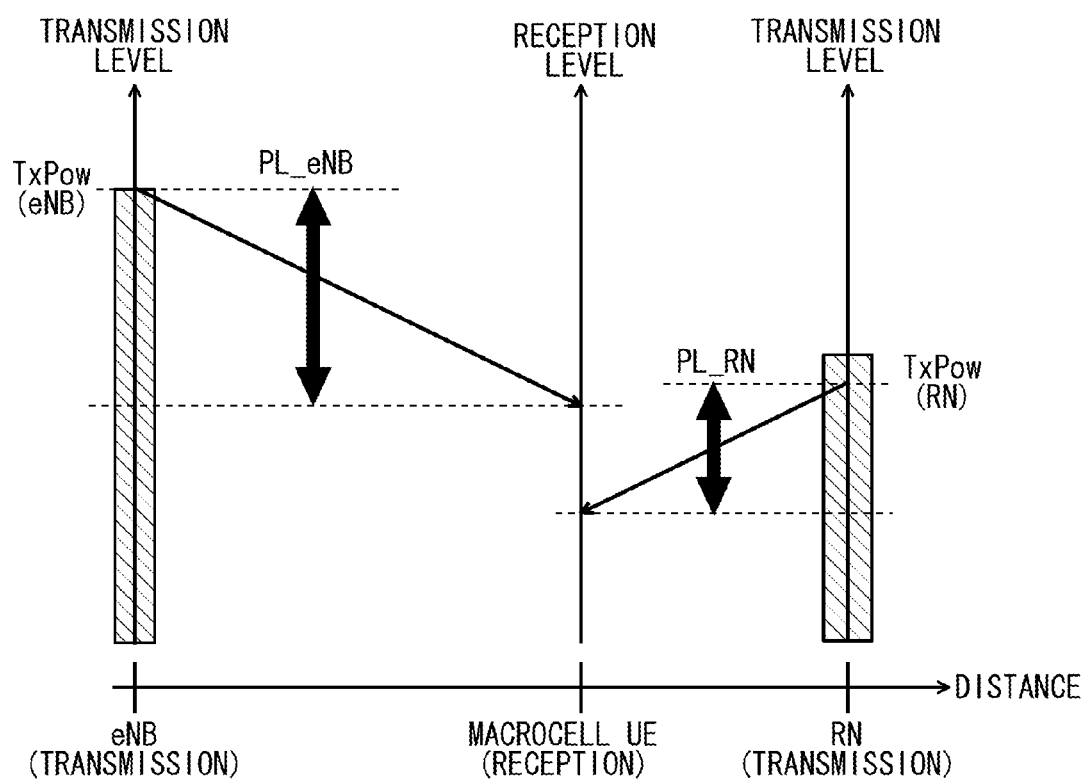
FIG. 8 is a diagram showing a path-loss between eNB-UE and a path-loss between RN-UE.
Figure 9:
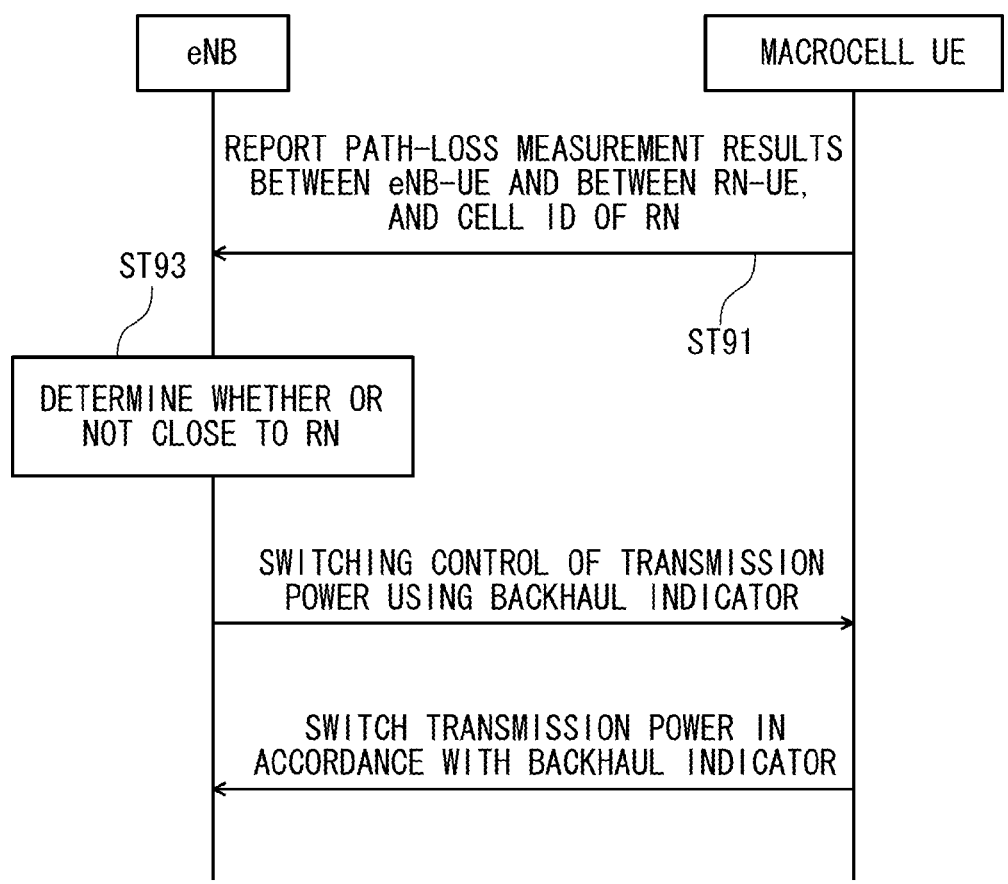
FIG. 9 shows an operation flow of a communication system according to a second embodiment.

The switching control of the transmission power values of the wireless communication terminal device 500 (macrocell US) will be described with reference to the FIGS. 8 and 9. FIG. 8 is a diagram showing a path-loss between eNB-UE and a path-loss between RN-UE in a macrocell UE which is close to an RN. In FIG. 8, the vertical axis of eNB and RN represents a transmission level, and the vertical axis of macrocell UE represents a reception level. The horizontal axis represents a distance therebetween. PL_eNB represents a path-loss between eNB-UE, and PL_RN represents a path-loss between RN-UE. FIG. 9 is a diagram showing the operation flow of the communication system according to Embodiment 2 of the invention.

The macrocell UE measures the path-loss PL_eNB between the eNB and the UE and the path-loss PL_RN between the RN around the eNB and the UE. In regard to the path-loss measurement in the macrocell UE, there is a method which uses the reference signal transmitted from the eNB or RN. The macrocell UE measures the reception level of the reference signal transmitted from the eNB or RN and compares the measurement result with detection information or a transmission power value notified through control information of a higher level layer, thereby measuring a path-loss.

The macrocell UE reports the measurement result of the path-loss PL_eNB and the path-loss PL_RN to the eNB (Step ST91). At this time, the path-loss (path-loss PL_RN) of the RN is reported along with the cell ID of the RN, such that the eNB can know an RN having a path-loss.

In the eNB, it is determined whether or not the macrocell UE is close to the RN from the path-loss reported from the macrocell UE (Step ST93). When the RN is in the uplink backhaul subframe, the macrocell UE performs transmission power switching control.

For a macrocell UE which closer to the RN, the eNB may increase the difference between transmission power in the "RN uplink backhaul subframe" and transmission power in a subframe other than the "RN uplink backhaul subframe".

For a macrocell UE which is closer to the RN, in order to suppress interference with the RN, transmission power in a subframe other than the "RN uplink backhaul subframe" is set to be low. When there is no interference with the RN, the amount of increase in power increases, thereby increasing reception quality in the eNB.

When the macrocell UE measures a path-loss and reports the measured path-loss and the cell ID of the RN, an instruction may be made such that the measured path-loss and the cell ID of the RN are reported from the eNB to the macrocell UE, or the macrocell UE itself may report the measured path-loss and the cell ID of the RN. The macrocell UE may measure a path-loss cyclically and reports the path-loss to the eNB, thereby following a change in the path-loss with movement of the macrocell UE.

As described above, in the communication system of this embodiment, since transmission power switching control can be efficiently applied to a macrocell UE which is close to a Relay cell, it is possible to obtain a high throughput improvement effect.

Although in this embodiment, a case where the two transmission power value of "high transmission power" and "low transmission power" are used as a transmission power value has been described, the invention is not limited thereto. A transmission power value may be set in multiple steps. For example, there is the following method. When a transmission power value is set in multiple steps in the macrocell UE in advance, a transmission power value to be used is notified from the eNB to the macrocell UP in the "RN uplink backhaul subframe". The eNB determines power at which the UE performs transmission from the path-loss reported in the same manner as in this embodiment, and notifies the use of the transmission power value to the macrocell UE. As the notification method, a method which uses an indicator indicating each transmission power value in multiple steps is considered. Accordingly, it is possible to set multiple transmission power values and to flexibly set transmission power depending on the situation of interference with the RN.

In the eNB, as information for determining whether or not the macrocell UE is close to the RN, positional information of the macrocell UE may be used. For example, the macrocell UE performs position measurement using a GPS or the like and reports the position measurement information to the eNB. Position information of the eNB or RN is acquired, and it is determined whether or not the macrocell UP is closed to the RN. Accordingly, it is possible to determine whether or not the macrocell UE is close to the RN with high precision.

In the eNB, as information for determining whether or not the macrocell UE is close to the RN, a signal propagation delay time may be used. For example, the eNB transmits a downlink signal, the macrocell UE receives the downlink signal, and an uplink signal is transmitted to the eNB at a set timing. When the eNB receives the uplink signal, the reception timing of the eNB is delayed for the propagation time with respect to the transmission timing. Since the delay time in the UE close to the eNB is short, and the delay time in the UE away from the eNB is long, it is possible to predict the distance from the eNB to the UE using the propagation delay time. Accordingly, the eNB can roughly predict whether or not the macrocell UE is close to the RN from the propagation delay time.

Figure 10:
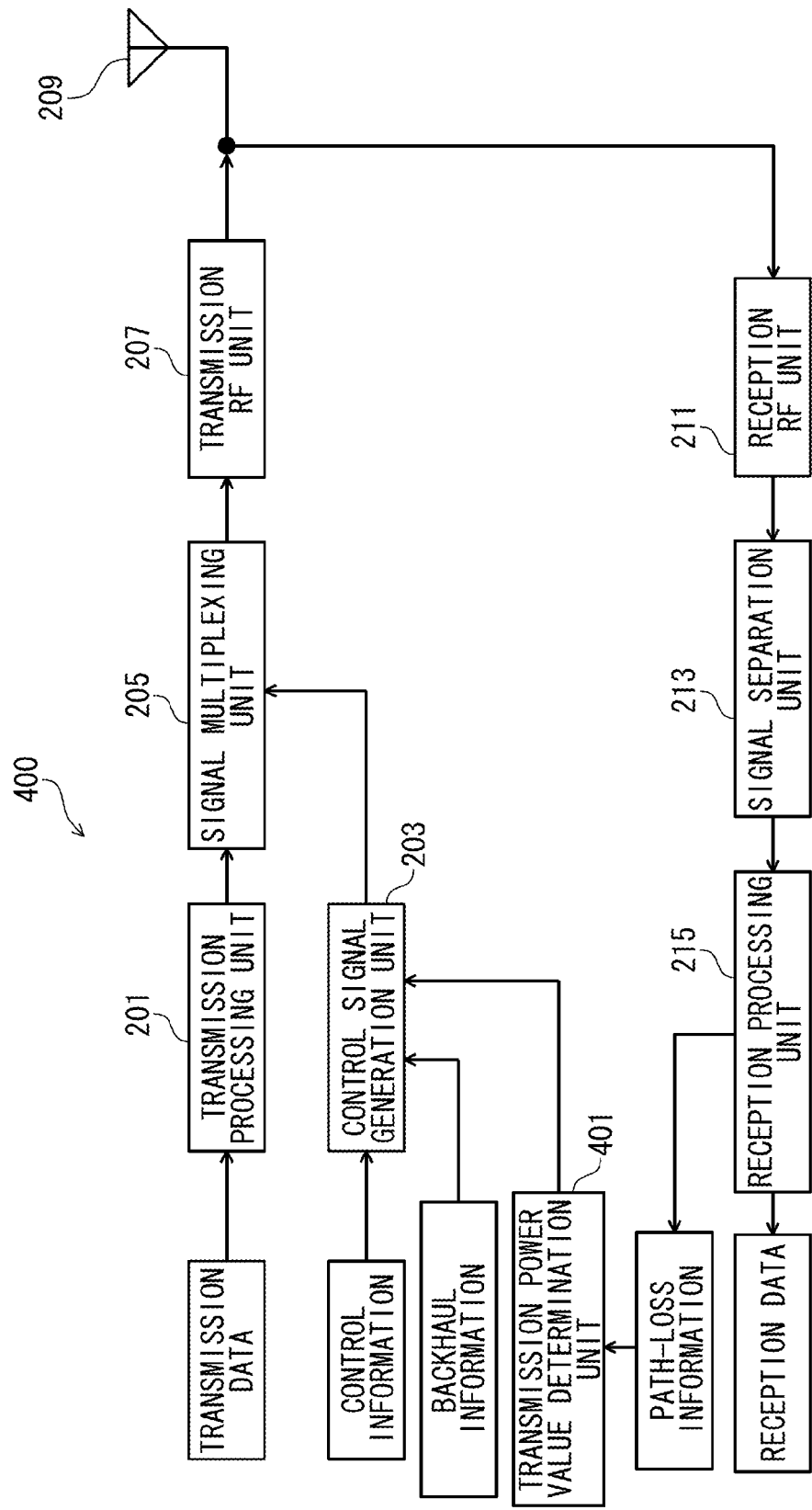
FIG. 10 is a block diagram showing the configuration of a base station device 400.
Figure 11:
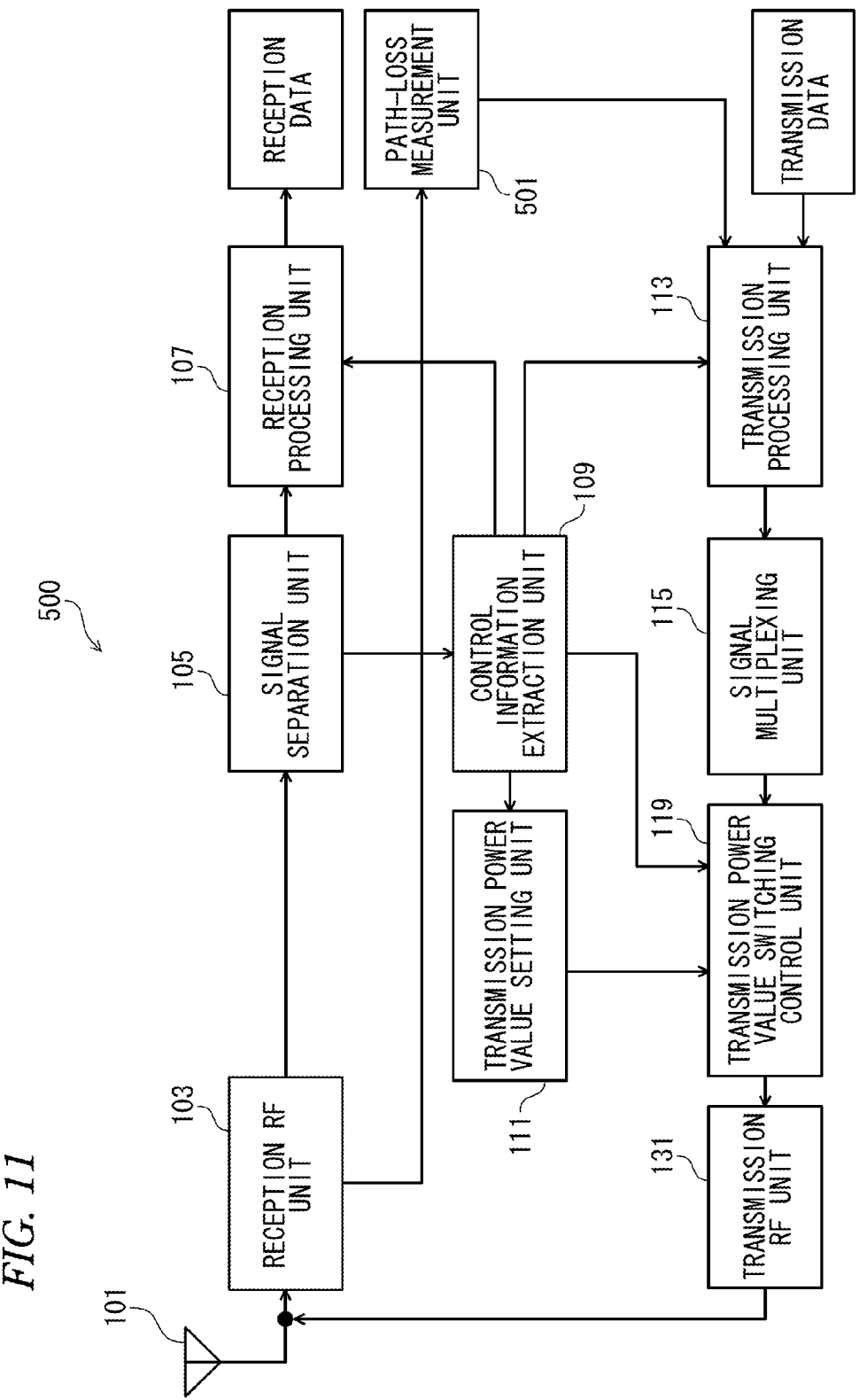
FIG. 11 is a block diagram showing the configuration of a wireless communication terminal device 500.

Next, the base station device (eNB) 400 and the wireless communication terminal device 500 (macrocell UE) connected to the base station device (eNB) 400 which constitute a part of the communication system of this embodiment will be described with reference to FIGS. 10 and 11.

The configuration of the base station device (eNB) 400 of the second embodiment will be described with reference to FIG. 10. FIG. 10 is a block diagram showing the configuration of the base station device 400. The base station device 400 shown in FIG. 10 includes a transmission power value determination unit 401, a transmission processing unit 201, a control signal generation unit 203, a signal multiplexing unit 205, a transmission RF unit 207, a reception RF unit 211, a signal separation unit 213, a reception processing unit 215, and an antenna 209. The base station device 400 shown in FIG. 10 is different from the base station device 200 shown in FIG. 5 in that path-loss information is provided instead of transmission power value information, and the transmission power value determination unit 401 is newly provided. The configuration excluding this point is the same as in the first embodiment, and in FIG. 10, the components common to FIG. 5 are represented by the same reference numerals.

Transmission data is data which is transmitted to each wireless communication terminal device in a downlink, and is input to the transmission processing unit 201.

The transmission processing unit 201 performs transmission processing, such as error correction coding and modulation, on transmission data. A signal subjected to the transmission processing is output to the signal multiplexing unit 205.

Control information includes control information (MCS information, resource allocation information, or the like)

relating to transmission data of the downlink, control information (MCS information, resource allocation information, or the like) relating to data to be transmitted from a terminal in an uplink, and control information relating to a cell. The control information is input to the control signal generation unit 203.

Path-loss information is information relating to the measurement results which are measured by the wireless communication terminal device 500 connected to the base station device 400 and reported in the uplink. The path-loss information is extracted from the reception signal by the reception processing unit 215. The path-loss information includes a path-loss between eNB-UE and a path-loss between RN-UE measured in the wireless communication terminal device 500, and the cell ID of the RN.

The transmission power value determination unit 401 determines an RN to which the macrocell UE is close on the basis of the reported path-loss information, and determines whether or not to perform transmission power switching control in the macrocell UE. The transmission power value determination unit 401 outputs information relating to the transmission power value of "high transmission power" described above (information relating to the transmission power value which used in the backhaul subframe) and information relating to the transmission power value of "low transmission power" described above (information relating to the transmission power value which is used in a subframe other than the backhaul subframe) for the macrocell UE, which performs the transmission power switching control, to the control signal generation unit 203 as a part of transmission power value information.

Backhaul information is information relating to the timing of the "RN uplink backhaul subframe", and is input to the control signal generation unit 203.

The control signal generation unit 203 generates a control signal to be transmitted from the wireless communication device in the downlink from the control information, the transmission power value information, the backhaul information, and the like. The generated control signal is output to the signal multiplexing unit 205.

The signal multiplexing unit 205 arranges the signal subjected to the transmission processing in the transmission processing unit 201, the control signal generated by the control signal generation unit 203, a reference signal (not shown), and the like in resources which transmit the signals, thereby multiplexing these signals. The multiplexed transmission signal is input to the transmission RF unit 207. As the resources in which the respective signals are arranged, time resources, frequency resources, and a combination of time and frequency resources are considered.

The transmission RF unit 207 performs RF processing, such as frequency conversion, power amplification, and filtering, on the transmission signals multiplexed by the signal multiplexing unit 205. The transmission signal subjected to the RF processing is transmitted from the antenna 209 toward the wireless communication terminal device 100.

The reception RF unit 211 performs RF processing, such as frequency conversion, power amplification, and filtering, on a signal received by the antenna 209 from the wireless communication terminal device 500. The reception signal subjected to the RF processing is input to the signal separation unit 213.

The signal separation unit 213 separates the reception signal subjected to the RF processing into data, the control signal, the reference signal, and the like. The separated reception data and reference signal are input to the reception processing unit 215.

The reception processing unit 215 performs channel estimation processing using the reference signal separated by the signal separation unit 213, and performs reception processing, such as demodulation and decoding, on the separated reception data using the channel estimation value. Data subjected to the reception processing becomes reception data.

Next, the wireless communication terminal device 500 (macrocell UE) which is connected to the base station device (eNB) 400 will be described with reference to FIG. 11. FIG. 11 is a block diagram showing the configuration of the wireless communication terminal device 500. The wireless communication terminal device 500 shown in FIG. 11 includes a path-loss measurement unit 501, an antenna 101, a reception RF unit 103, a signal separation unit 105, a reception processing unit 107, a control information extraction unit 109, a transmission power value setting unit 111, a transmission processing unit 113, a signal multiplexing unit 115, a transmission power value switching control unit 119, and a transmission RF unit 131. The wireless communication terminal device 500 shown in FIG. 11 is different from the wireless communication terminal device 300 shown in FIG. 6 in that the path-loss measurement unit 501 is further provided.

The reception RF unit 103 performs reception RF processing, such as filtering for removing a signal outside a communication band, frequency conversion to an IF frequency band or a baseband, and power amplification, on a signal received by the antenna 101. The reception signal subjected to the RF processing is output to the signal separation unit 105 and the path-loss measurement unit 501.

The path-loss measurement unit 501 measures a path-loss between eNB-UE and a path-loss between RN-UE using the signal subjected to the reception RF processing. The measured path-losses are output to the transmission processing unit 113. Thereafter, the path-losses are reported from the wireless communication device to the base station device 400 in the uplink. The cell ID of the relay station (RN) is notified along with the path-loss between RN-UE.

The reception processing unit 107 performs channel estimation processing using the reference signal separated by the signal separation unit 105, and performs reception processing, such as demodulation and decoding, on the separated reception data using the channel estimation value. Data subjected to the reception processing becomes reception data.

The control information extraction unit 109 performs reception processing on the control signal separated by the signal separation unit 105, and extracts control information, such as control information relating to data received in the downlink, control information relating to data to be transmitted in the uplink, control information relating to the cell, transmission power value information in the wireless communication device, and information relating to the timing of the "RN uplink backhaul subframe".

Of the control information extracted by the control information extraction unit 109, the transmission power value information output to the transmission power value setting unit 111, and the uplink backhaul subframe timing information is output to the transmission power value switching control unit 119. The control information relating to reception data of the downlink is output to the reception processing unit 107, and the control information relating to transmission data of the uplink is output to the transmission processing unit 113.

The transmission power value setting unit 111 sets transmission power values, which are switched and controlled in the transmission power value switching control unit 119, on the basis of the transmission power value information extracted in the control information extraction unit 109. The transmission power values which are switched and controlled in the transmission power value switching control unit 119 are two transmission power values of the transmission power value of "high transmission power" and the transmission power value of "low transmission power" described above.

Transmission data is data which is transmitted from the wireless communication device to the base station device 400 in the uplink.

The transmission processing unit 113 performs transmission processing, such as coding and modulation, on transmission data on the basis of the control information relating to transmission data of the uplink extracted by the control information extraction unit 109. In this embodiment, transmission data includes the measurement result of the path-loss between eNB-UE and the path-loss between RN-UE measured by the path-loss measurement unit 501 and the cell ID of the relay station (RN). A signal subjected to the transmission processing is output to the signal multiplexing unit 115.

The signal multiplexing unit 115 arranges the signal subjected to the transmission processing in the transmission processing unit 113, the reference signal (not shown), and the like in resources which transmit the signals, thereby multiplexing the signals. As the resources in which the signals are arranged, for example, time resources, frequency resources, and a combination of time and frequency resources are considered. The multiplexed transmission signal is output to the transmission power value switching control unit 119.

The transmission power value switching control unit 119 switches the transmission power of the transmission signal on the basis of the timing information of the "RN uplink backhaul subframe" extracted by the control information extraction unit 109. If the timing of "RN uplink backhaul subframe" is reached, transmission is performed at "high transmission power" described above. If a subframe other than the "RN uplink backhaul subframe" is reached, transmission is performed at "low transmission power" described above.

The transmission RF unit 131 performs RF processing, such as frequency conversion and filtering, on the transmission signal power-amplified by the transmission power value switching control unit 119. The transmission signal subjected to the RF processing is transmitted from the antenna 101 toward the base station device 400.

Third Embodiment

A base station device (eNB) notifies timing information of an "RN uplink backhaul subframe" to a wireless communication terminal device (macrocell UE) using detection information or control information of a higher level layer, thereby applying transmission power switching control to the macrocell UE without notifying a backhaul indicator every time along with control information of the uplink.

Accordingly, in the communication system of the third embodiment, a base station device (eNB) 700 notifies the timing information of the "RN uplink backhaul subframe" to all UEs in the macrocell. For example, there is a method in which the timing information of the "RN uplink backhaul subframe" is bitmapped relating to a subframe number, and the timing bitmap is notified.

For example, a case where the timing of the backhaul subframe is repeated in a 10-subframe cycle, and subframes with subframe numbers #1, #3, #6, and #8 are used as a backhaul subframe will be described. In the timing bitmap, if it is assumed that "1" represents the timing information of the "RN uplink backhaul subframe", the timing bitmap becomes "0101001010". The base station device (eNB) 700 notifies the timing bitmap "0101001010" to the all UEs (macrocell UEs) in the cell of the wireless communication device. For this reason, all macrocell UEs which receive the timing bitmap "0101001010" can know which subframe is the "RN uplink backhaul subframe".

An instruction about whether or not to perform transmission power switching control in each macrocell PE is issued from the base station device (eNB) 700. In a UE which receives the instruction to perform transmission power switching control from the eNB, when performing uplink transmission with a subframe number of "1" in the timing bitmap, the macrocell UE transmits an uplink signal at "high transmission power". When uplink transmission is performed with a subframe number of "0" in the timing bitmap, the macrocell UE transmits a signal at "low transmission power".

The notification method of the timing information of the backhaul subframe is not limited to a timing bitmap. For example, when the timing of the backhaul subframe can be patterned in advance, there is a method in which the pattern table is defined, and an indicator indicating a pattern is notified. When the number of patterns is limited and the number of bits allocated to the indicator becomes smaller than the number of bits used in the timing bitmap, it is possible to suppress the number of signaling bits.

As described above, in the communication system of the third embodiment, the transmission power of the macrocell UE can be increased in the "RN uplink backhaul subframe" without transmitting a signal from the base station device (eNB) 700 every time, thereby improving throughput.

Figure 12:
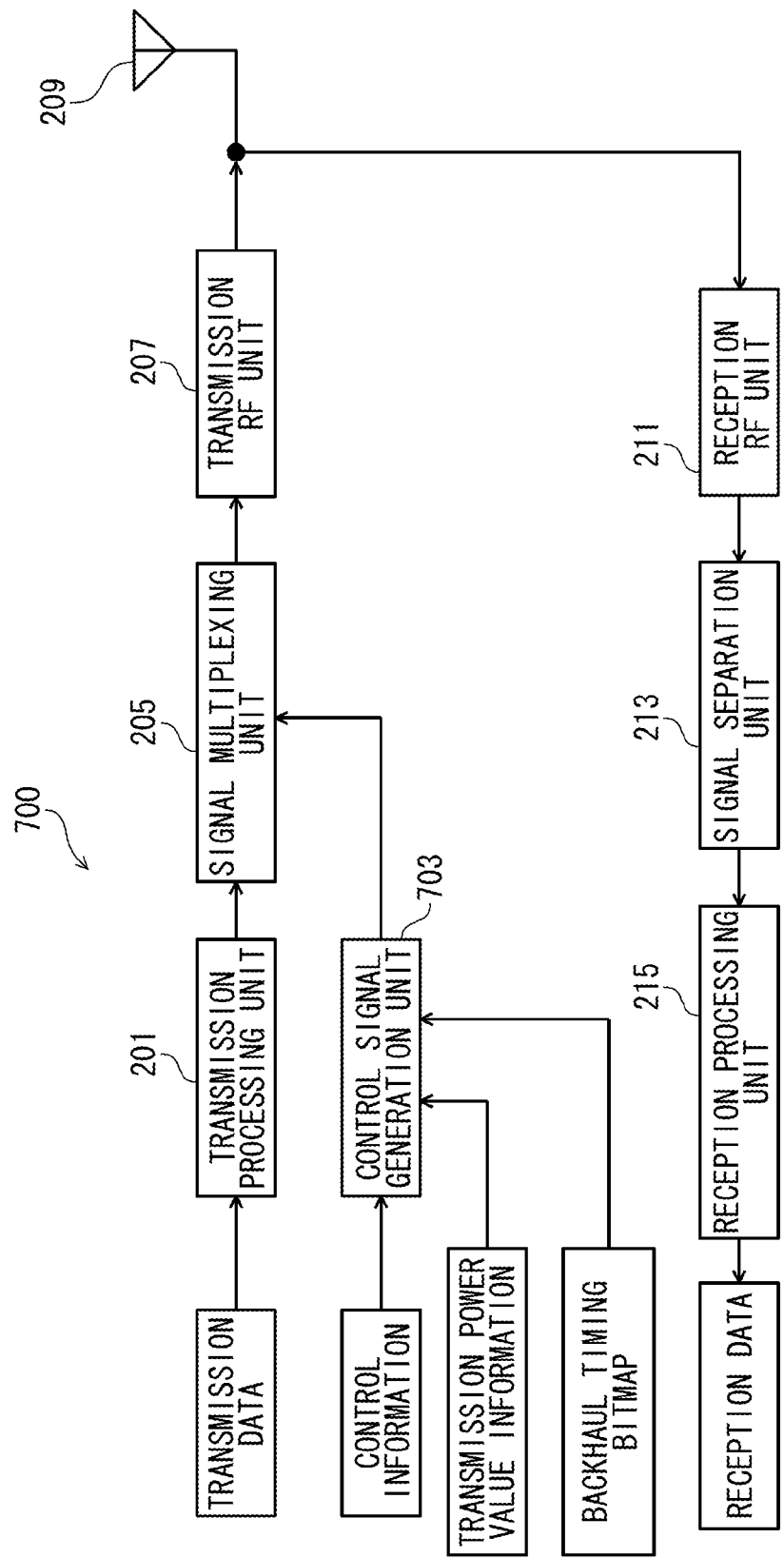
FIG. 12 is a block diagram showing the configuration of a base station device 700.

Next, a base station device (eNB) 700 and a wireless communication terminal device 800 (macrocell UE) connected to the base station device (eNB) 700 which constitute a part of the communication system of this embodiment will be described with reference to FIGS. 12 and 13.

<Block Diagram: Base Station Device 700>

The configuration of the base station device (eNB) 700 of the third embodiment will be described with reference to FIG. 12. FIG. 12 is a block diagram showing the configuration of the base station device 700. The base station device 700 shown in FIG. 12 includes a transmission processing unit 201, a control signal generation unit 703, a signal multiplexing unit 205, a transmission RF unit 207, a reception RF unit 211, a signal separation unit 213, a reception processing unit 215, and an antenna 209. The base station device 700 shown in FIG. 12 is different from the base station device 200 shown in FIG. 5 in that a backhaul subframe table is provided instead of backhaul information, and the control signal generation unit 703 is provided instead of the control signal generation unit 203. The configuration excluding this point is the same as in the first embodiment, and in FIG. 12, the components common to FIG. 5 are represented by the same reference numerals.

Transmission data is data which is transmitted to each wireless communication terminal device in a downlink, and is input to the transmission processing unit 201.

The transmission processing unit 201 performs transmission processing, such as error correction coding and modulation, on transmission data. A signal subjected to the transmission processing is output to the signal multiplexing unit 205.

Control information includes control information (MCS information, resource allocation information, or the like) relating to transmission data of the downlink, control information (MCS information, resource allocation information, or the like) relating to data to be transmitted from a terminal in an uplink, and control information relating to a cell. The control information is input to the control signal generation unit 703.

Transmission power value information is information relating to transmission power values which are used in a backhaul subframe and other subframes in the wireless communication terminal device 800. The transmission power value information is input to the control signal generation unit 703.

The information relating to the transmission power value which is used in the backhaul subframe in the wireless communication terminal device 800 is information relating to the transmission power value of "high transmission power" described above. The information relating to the transmission power value which is used in a subframe other than the backhaul subframe in the wireless communication terminal device 800 is information relating to the transmission power value of "low transmission power" described above.

A backhaul timing bitmap is obtained by bitmapping the timing information of the "RN uplink backhaul subframe". The backhaul timing bitmap is input to the control signal generation unit 703, and is notified to all UEs in the macrocell simultaneously though detection information or control information of a higher level layer.

The control signal generation unit 703 generates a control signal to be transmitted from the wireless communication device in the downlink from the control information, the transmission power value information, the backhaul timing bitmap, and the like. The generated control signal is output to the signal multiplexing unit 205.

The signal multiplexing unit 205 arranges the signal subjected to the transmission processing in the transmission processing unit 201, the control signal generated by the control signal generation unit 203, a reference signal (not shown), and the like in resources which transmit the signals, thereby multiplexing these signals. The multiplexed transmission signal is input to the transmission RF unit 207. As the resources in which the respective signals are arranged, time resources, frequency resources, and a combination of time and frequency resources are considered.

The transmission RF unit 207 performs RF processing, such as frequency conversion, power amplification, and filtering, on the transmission signal multiplexed by the signal multiplexing unit 205. The transmission signal subjected to the RF processing is transmitted from the antenna 209 toward the wireless communication terminal device 800.

The reception RF unit 211 performs RF processing, such as frequency conversion, power amplification, and filtering, on a signal received by the antenna 209 from the wireless communication terminal device 800. The reception signal subjected to the RF processing is input to the signal separation unit 213.

The signal separation unit 213 separates the reception signal subjected to the RF processing into data, the control signal, the reference signal, and the like. The separated reception data and reference signal are input to the reception processing unit 215.

The reception processing unit 215 performs channel estimation processing using the reference signal separated by the signal separation unit 213, and performs reception processing, such as demodulation and decoding, on the separated reception data using the channel estimation value. Data subjected to the reception processing becomes reception data.

<Block Diagram: Wireless Communication Terminal Device 800>

The configuration of the wireless communication terminal device 800 which constitutes a part of the communication system of this embodiment will be described with reference to FIG. 13. FIG. 13 is a block diagram showing the configuration of the wireless communication terminal device 800. The wireless communication terminal device 800 shown in FIG. 13 includes an antenna 101, a reception RF unit 103, a signal separation unit 105, a reception processing unit 107, a control information extraction unit 809, a transmission power value setting unit 111, a backhaul timing bitmap storage unit 812, a transmission processing unit 113, a signal multiplexing unit 115, a transmission power value switching control unit 819, and a transmission RF unit 131.

Figure 6:
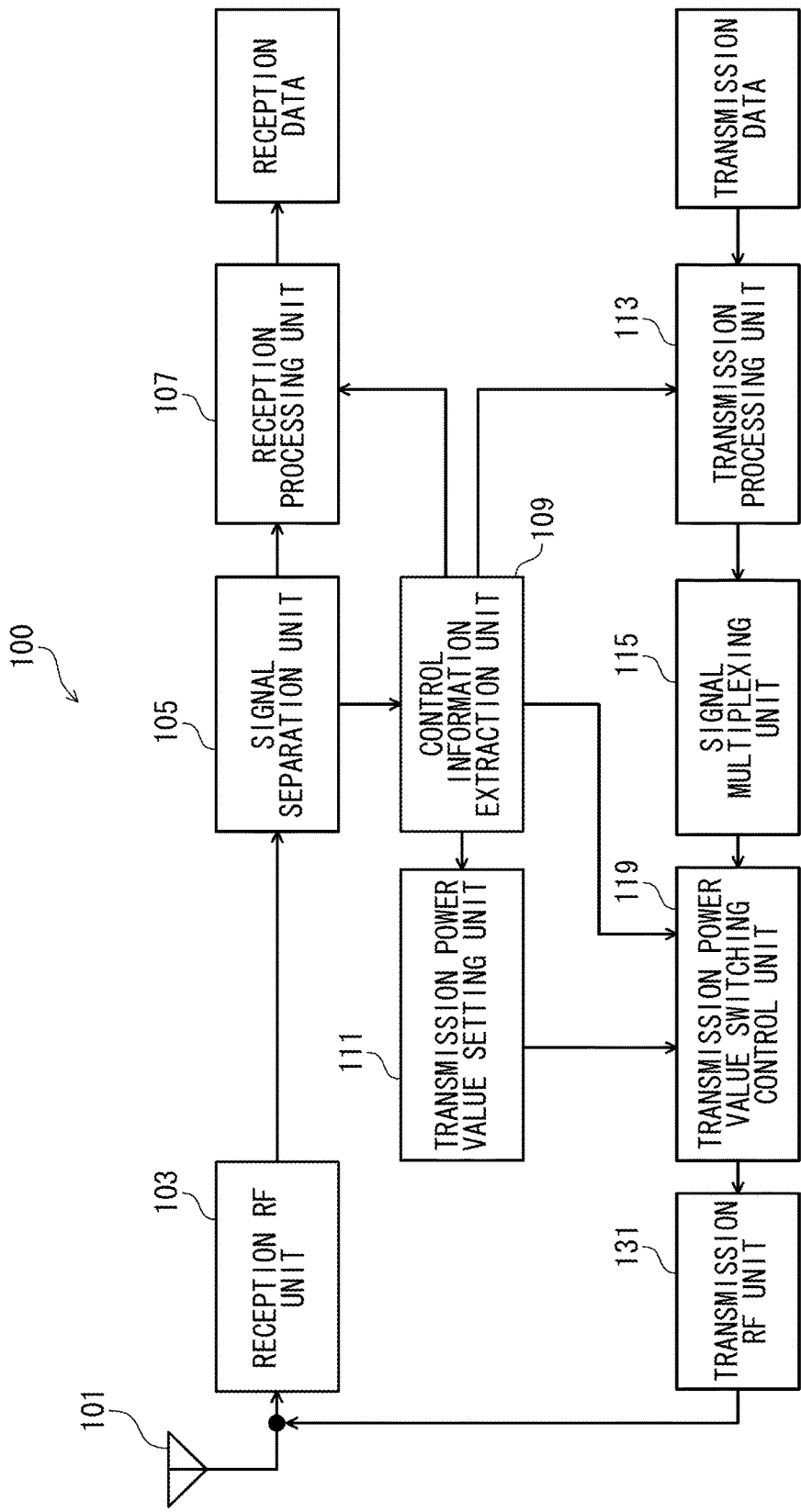
FIG. 6 is a block diagram showing the configuration of a wireless communication terminal device 100.
Figure 7:
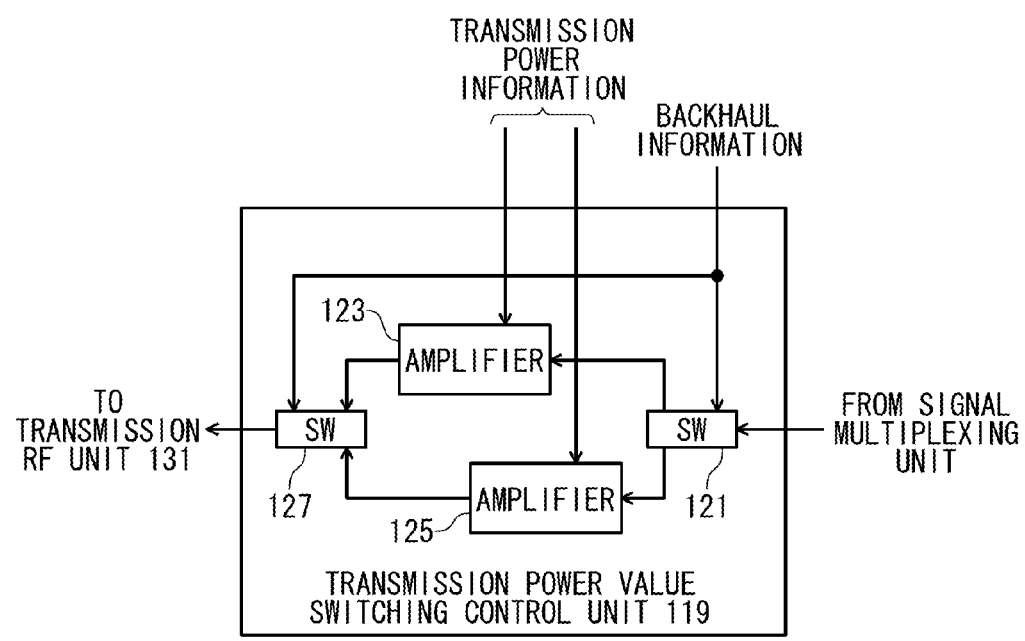
FIG. 7 shows a specific configuration example of a transmission power value switching control unit 119.
Figure 13:
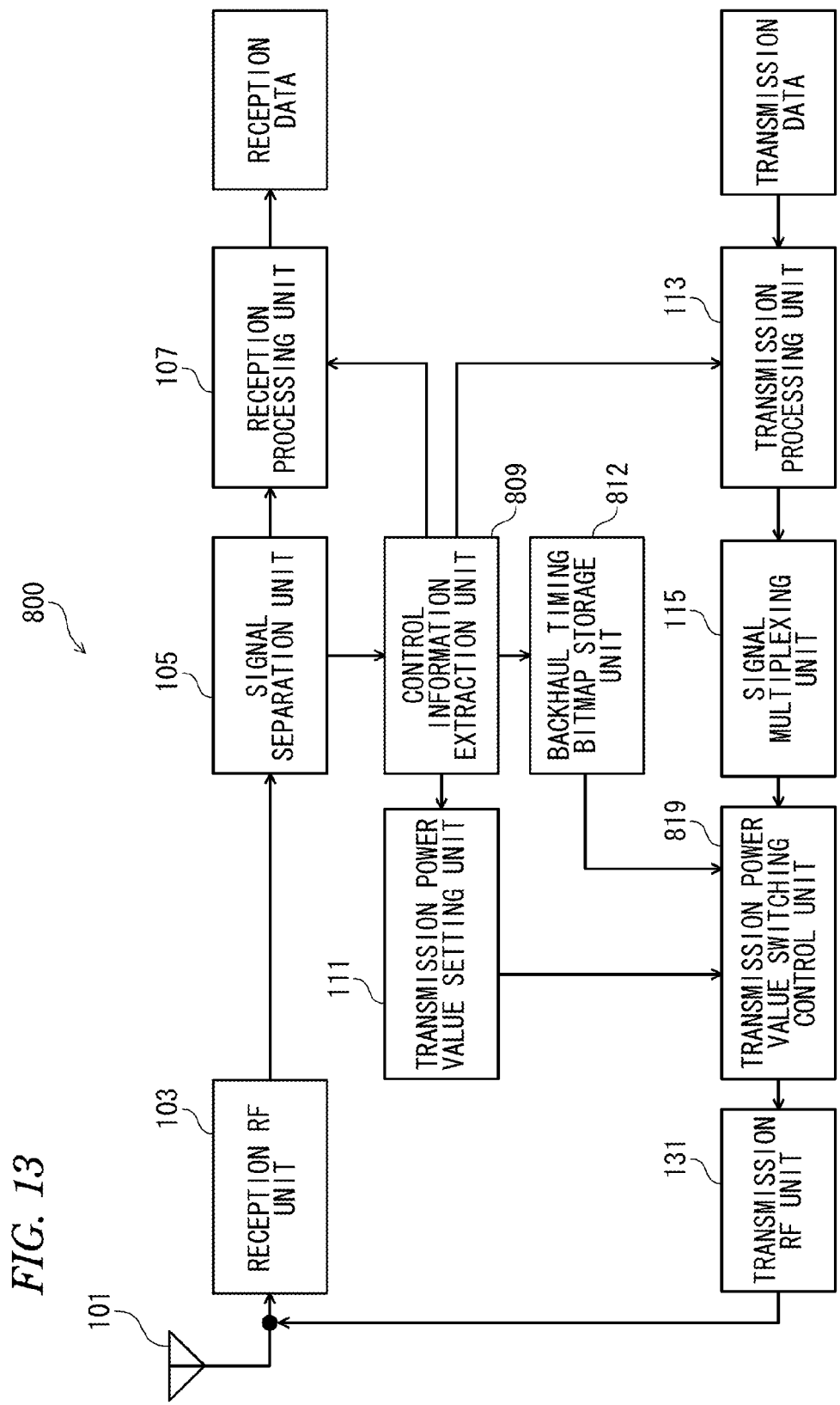
FIG. 13 is a block diagram showing the configuration of a wireless communication terminal device 800.

The wireless communication terminal device 800 shown in FIG. 13 is different from the wireless communication terminal device 100 shown in FIG. 6 in that (1) the backhaul timing bitmap storage unit 812 is further provided, (2) the control information extraction unit 809 is provided instead of the control information extraction unit 109, and (3) the transmission power value switching control unit 819 is provided instead of the transmission power value switching control unit 119. The configuration excluding the three points is the same as in the first embodiment, and in FIG. 13, the components common to FIG. 6 are represented by the same reference numerals.

The reception RF unit 103 performs reception RF processing, such as filtering for removing a signal outside a communication band, frequency conversion to an IF frequency band or a baseband, and power amplification, on a signal received by the antenna 101. The reception signal subjected to the RF processing is output to the signal separation unit 105.

The signal separation unit 105 separates the reception signal subjected to the RF processing into data, the control signal, and the reference signal. The separated reception data and reference signal are output to the reception processing unit 107, and the control signal is output to the control information extraction unit 809.

The reception processing unit 107 performs channel estimation processing using the reference signal separated by the signal separation unit 105, and performs reception processing, such as demodulation and decoding, on the separated reception data using the channel estimation value. Data subjected to the reception processing becomes reception data.

The control information extraction unit 809 performs reception processing on the control signal separated by the signal separation unit 105, and extracts control information, such as control information relating to data received in the downlink, control information relating to data to be transmitted in the uplink, control information relating to the cell, transmission power value information in the wireless communication device, and the backhaul timing bitmap.

The backhaul timing bitmap is a bitmap which represents the timing information of the "RN uplink backhaul subframe" notified from the base station device 700 through detection information or control information of a higher level layer. When the backhaul timing bitmap is notified from the base station device 700, the backhaul timing bitmap extracted by the control information extraction unit 809 is stored in the backhaul timing bitmap storage unit 812 and output to the transmission power value switching control unit 819.

The transmission power value setting unit 111 sets transmission power values, which are switched and controlled in the transmission power value switching control unit 819, on the basis of the transmission power value information extracted by the control information extraction unit 809. The transmission power values which are switched and controlled in the transmission power value switching control unit 819 are two transmission power values of the transmission power value of "high transmission power" and the transmission power value of "low transmission power" described above.

Transmission data is data which is transmitted from the wireless communication device to the base station device 700 in the uplink.

The transmission processing unit 113 performs transmission processing, such as coding, on transmission data on the basis of the control information relating to transmission data of the uplink extracted by the control information extraction unit 809. A signal subjected to the transmission processing is output to the signal multiplexing unit 115.

The signal multiplexing unit 115 arranges the signal subjected to the transmission processing in the transmission processing unit 113, the reference signal (not shown), and the like in resources which transmit the signals, thereby multiplexing the signals. As the resources in which the signals are arranged, for example, time resources, frequency resources, and a combination of time and frequency resources are considered. The multiplexed transmission signal is output to the transmission power value switching control unit 819.

The transmission power value switching control unit 819 switches the transmission power of the transmission signal on the basis of the backhaul timing bitmap stored in the backhaul timing bitmap storage unit 812. If the timing of "RN uplink backhaul subframe" is reached, transmission is performed at "high transmission power" described above. If a subframe other than the "RN uplink backhaul subframe" is reached, transmission is performed at "low transmission power" described above.

The transmission RF unit 131 performs RF processing, such as frequency conversion and filtering, on the transmission signal power-amplified by the transmission power value switching control unit 819. The transmission signal subjected to the RF processing is transmitted from the antenna 101 toward the base station device 700.

Fourth Embodiment

A communication system of a fourth embodiment will be described. In the communication system of this embodiment, a wireless communication terminal device 900 (macrocell UE) which is connected to a base station device is configured such that a macrocell UE itself detects the timing of the "RN uplink backhaul subframe", and transmission power switching control is performed on the basis of the detection information.

A method in which the wireless communication terminal device 900 itself detects the timing of the "RN uplink backhaul subframe" will be described. For example, there is the following method. The wireless communication terminal device 900 detects a Relay cell (RN) therearound through adjacent cell search. The wireless communication terminal device 900 receives system information (SIB: System Information Block) which is transmitted from the detected relay station (RN), and detects a downlink backhaul subframe notified through the system information.

There is a case where an uplink backhaul subframe is associated with a downlink backhaul subframe. For example, in LTE, at the time of allocation of data transmission of the uplink in the PDCCH of the downlink, it is stated that data transmission of the uplink is performed after four frames from a subframe in which the PDCCH is transmitted. For this reason, the backhaul subframe of the uplink can be associated with the backhaul subframe of the downlink, for example, the backhaul subframe of the uplink is allocated after four subframes from the backhaul subframe of the downlink. The macrocell UE can detect the "RN uplink backhaul subframe" detected through adjacent cell search on the basis of the above-described association. The macrocell UE transmits a signal while switching transmission power on the basis of the estimated timing of the backhaul subframe of the uplink.

As the method of detecting the "RN uplink backhaul subframe", when the RN notifies the backhaul subframe of the uplink in the system information, a method in which the macrocell UE directly detects the information may be used.

As the method of detecting the "RN uplink backhaul subframe", when the eNB notifies backhaul subframe information of the RN (RN under eNB) connected to the eNB to the macrocell UE through detection information, control information of a higher level layer, or the like, a method in which the macrocell UE directly detect the information may be used.

As the method of detecting the "RN uplink backhaul subframe", a method in which the macrocell UE detects control information of backhaul of the uplink notified from the eNB to the RN (RN under eNB) connected to the eNB may be used.

As described above, in the communication system of this embodiment, the transmission power of the macrocell UE can be increased in the "RN uplink backhaul subframe" without increasing signaling from the eNB, thereby improving throughput.

<Block Diagram: Wireless Communication Terminal Device 900>

Figure 14:
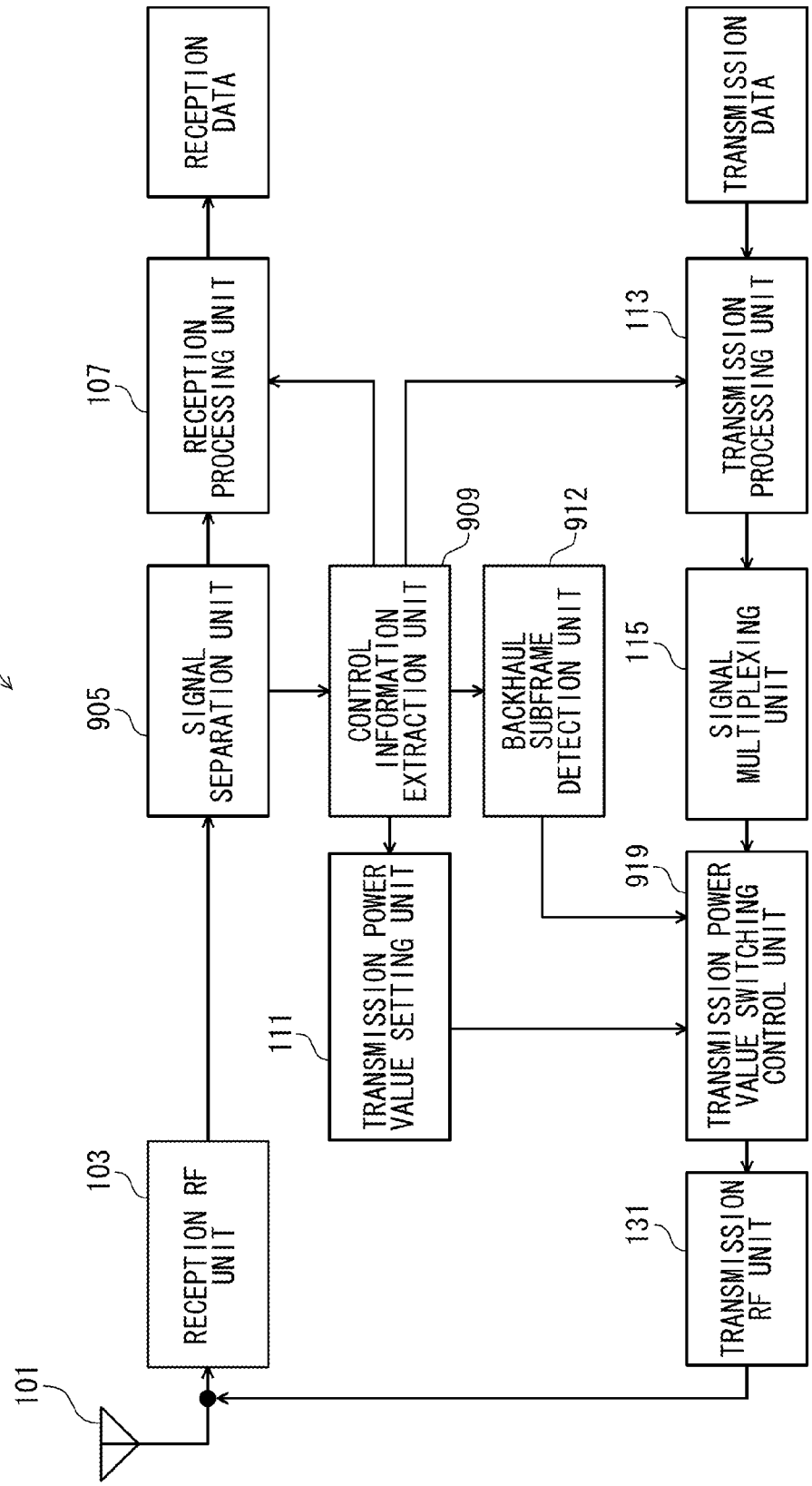
FIG. 14 is a block diagram showing the configuration of a wireless communication terminal device 900.
Figure 15:
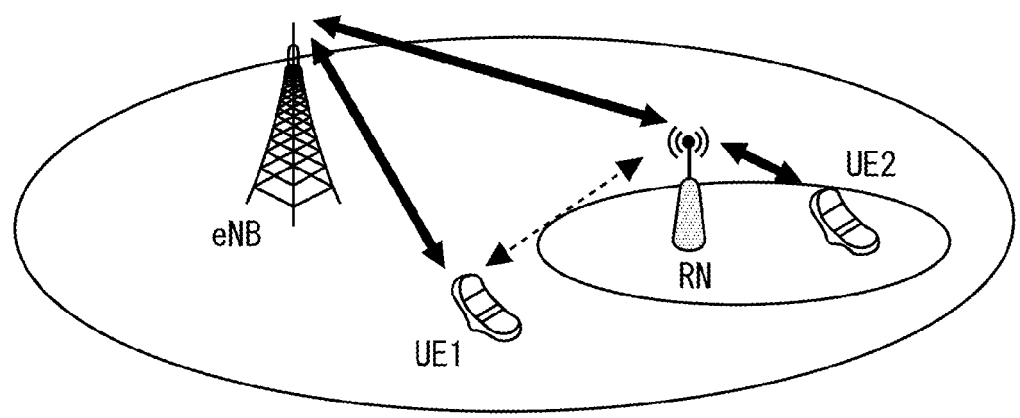
FIG. 15 shows a communication system using Relay.
Figure 16:
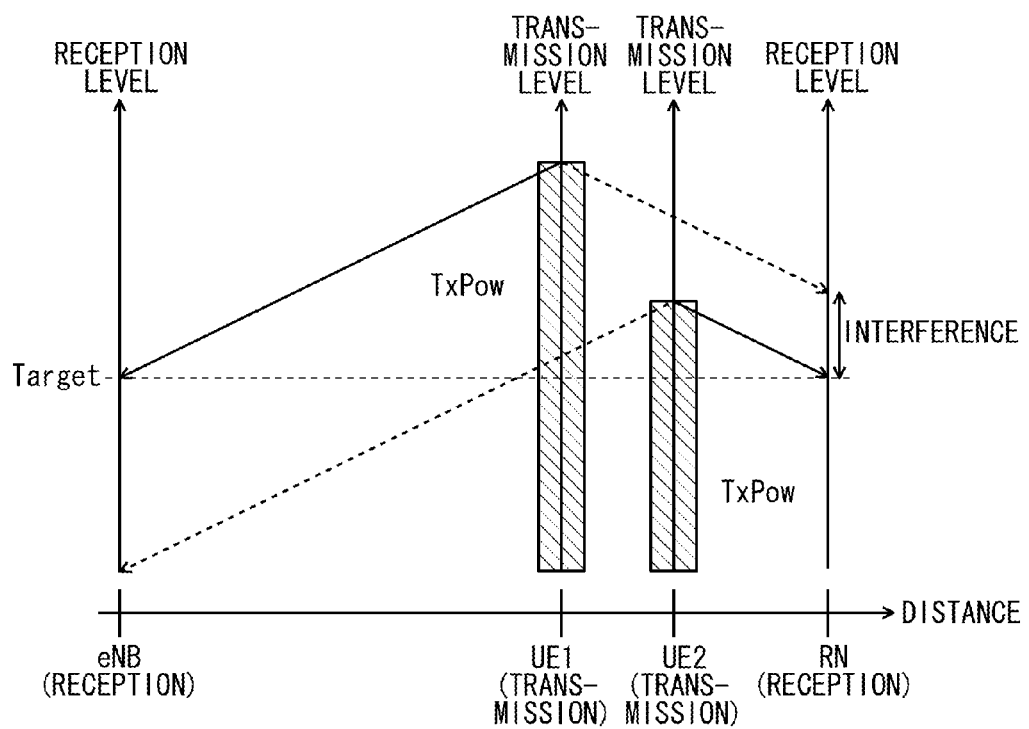
FIG. 16 is a diagram (first view) illustrating the transmission power of a plurality of terminals in an uplink.
Figure 17:
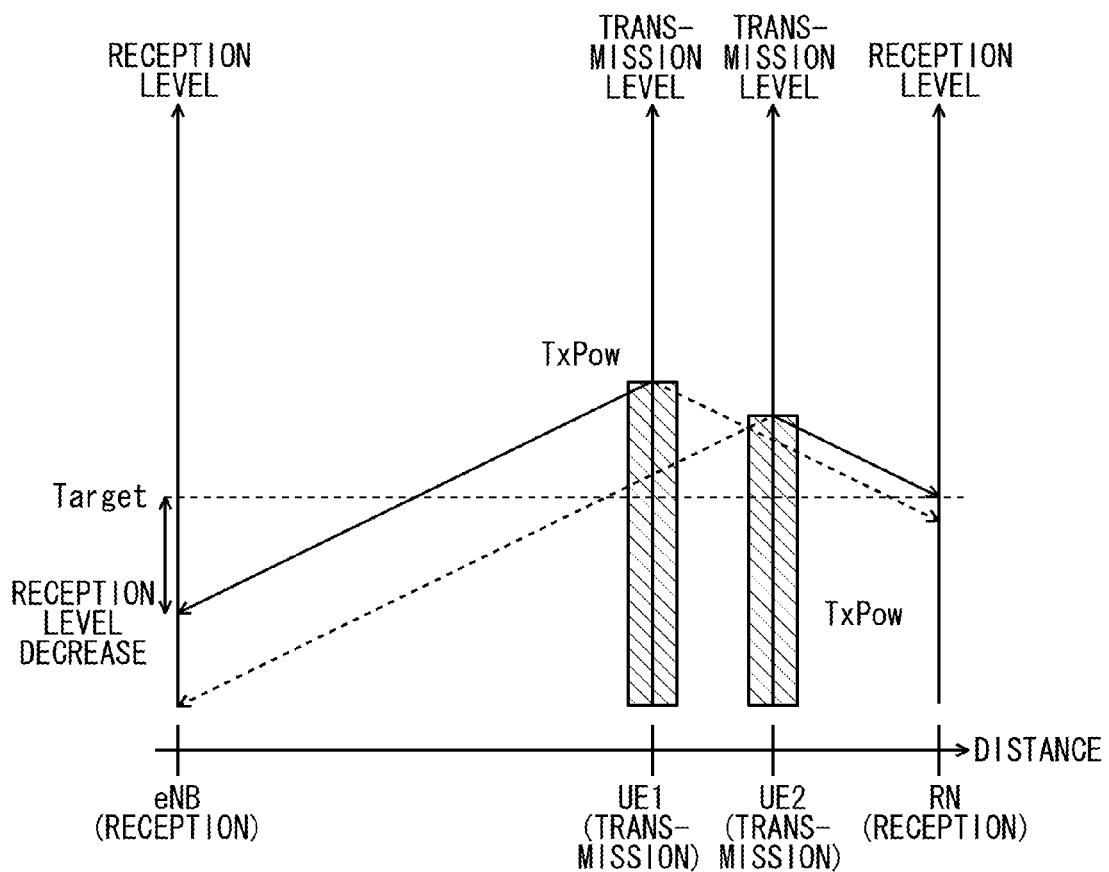
FIG. 17 is a diagram (second view) illustrating the transmission power of a plurality of terminals in an uplink.

The configuration of the wireless communication terminal device 900 which constitutes a part of the communication system of this embodiment will be described with reference to FIG. 14. FIG. 14 is a block diagram showing the configuration of the wireless communication terminal device 900. The wireless communication terminal device 900 shown in FIG. 14 includes an antenna 101, a reception RF unit 103, a signal separation unit 905, a reception processing unit 107, a control information extraction unit 909, a transmission power value setting unit 111, a backhaul subframe detection unit 912, a transmission processing unit 113, a signal multiplexing unit 115, a transmission power value switching control unit 919, and a transmission RF unit 131.

The wireless communication terminal device 900 shown in FIG. 14 is different from the wireless communication terminal device 100 shown in FIG. 6 in that (1) the backhaul subframe detection unit 912 is further provided, (2) the control information extraction unit 909 is provided instead of the control information extraction unit 109, (3) the signal separation unit 905 is provided instead of the signal separation unit 105, and (4) the transmission power value switching control unit 919 is provided instead of the transmission power value switching control unit 119. The configuration excluding these four points is the same as in the first embodiment, and in FIG. 14, the components common to FIG. 6 are represented by the same reference numerals.

The reception RF unit 103 performs reception RF processing, such as filtering for removing a signal outside a communication band, frequency conversion to an IF frequency band or a baseband, and power amplification, on a signal received by the antenna 101. The reception signal subjected to the RF processing is output to the signal separation unit 105.

The signal separation unit 905 separates the reception signal subjected to the RF processing into data, the control signal, and the reference signal. The separated reception data and reference signal are output to the reception processing unit 107, and the control signal is output to the control information extraction unit 909. When the backhaul subframe detection unit 912 detects the backhaul subframe, if control information which is transmitted from an adjacent RN is used, separation is performed on the reception signal from the adjacent RN, and a control transmitted from the adjacent RN is output to the control information extraction unit 909.

The reception processing unit 107 performs channel estimation processing using the reference signal separated by the signal separation unit 905, and performs reception processing, such as demodulation and decoding, on the separated reception data using the channel estimation value. Data subjected to the reception processing becomes reception data.

The control information extraction unit 909 performs reception processing on the control signal separated by the signal separation unit 905, and extracts control information, such as control information relating to data received in the downlink, control information relating to data to be transmitted in the uplink, control information relating the cell, and transmission power value information in the wireless communication device. The backhaul subframe detection unit 912 extracts control information which is used when detecting the backhaul subframe. For example, there is system information of an adjacent RN which is control information to be transmitted from the adjacent RN, or the like.

Of the control information extracted by the control information extraction unit 909, the transmission power value information is output to the transmission power value setting unit 111, the control information relating to reception data of the downlink is output to the reception processing unit 107, and the control information relating to transmission data of the uplink is output to the transmission processing unit 113.

The transmission power value setting unit 111 sets transmission power values, which are switched and controlled in the transmission power value switching control unit 919, on the basis of the transmission power value information extracted in the control information extraction unit 909. The transmission power values which are switched and controlled in the transmission power value switching control unit 919 are two transmission power values of the transmission power value of "high transmission power" and the transmission power value of "low transmission power" described above.

The backhaul subframe detection unit 912 detects system information which is control information to be transmitted from an adjacent RN extracted in the control information extraction unit 909, detects the downlink backhaul subframe timing from the system information, and detects the uplink backhaul subframe of the adjacent RN from the downlink backhaul subframe timing. The detected timing information of the "RN uplink backhaul subframe" is output to the transmission power value switching control unit 919.

Transmission data is data which is transmitted from the wireless communication device to the base station in the uplink.

The transmission processing unit 113 performs transmission processing, such as coding, on transmission data on the basis of the control information relating to transmission data of the uplink extracted by the control information extraction unit 109. A signal subjected to the transmission processing is output to the signal multiplexing unit 115.

The signal multiplexing unit 115 arranges the signal subjected to the transmission processing in the transmission processing unit 113, the reference signal (not shown), and the like in resources which transmit the signals, thereby multiplexing the signals. As the resources in which the signals are arranged, for example, time resources, frequency resources, and a combination of time and frequency resources are considered. The multiplexed transmission signal is output to the transmission power value switching control unit 919.

The transmission power value switching control unit 919 switches the transmission power of the transmission signal on the basis of the timing information of the "RN uplink backhaul subframe" detected by the backhaul subframe detection unit 912. If the timing of "RN uplink backhaul subframe" is reached, transmission is performed at "high transmission power" described above. If a subframe other than the "RN uplink backhaul subframe" is reached, transmission is performed at "low transmission power" described above.

The transmission RF unit 131 performs RF processing, such as frequency conversion and filtering, on the transmission signal power-amplified by the transmission power value switching control unit 919. The transmission signal subjected to the RF processing is transmitted from the antenna 101 toward the base station device.

Although the foregoing embodiments, an antenna has been described, the same may apply to an antenna port. An antenna port indicates a logical antenna which is constituted by one or a plurality of physical antennas. That is, the antenna port is not limited as indicating a single physical antenna, and may indicate an array antenna having a plurality of antennas, or the like. For example, in LTE, while how many physical antennas constitute the antenna port is not defined, a base station is defined as a minimum unit for transmission of different reference signals. The antenna port may be defined as a minimum unit in multiplying the weight of a precoding vector.

Each functional block used to describe the embodiment and each modification is typically implemented by an LSI, which is an integrated circuit. Each functional block may be integrated into one chip, or a portion of or the entire functional block may be integrated into one chip. Here, the LSI is used as the integrated circuit, but the integrated circuit may be called an IC, a system LSI, a super LSI, or an ultra LSI according to the degree of integration.

In addition, a circuit integration method is not limited to LSI, but circuit integration may be implemented by a dedicated circuit or a general-purpose processor. After the LSI circuit is manufactured, a programmable FPGA (Field Programmable Gate Array) or a reconfigurable processor capable of reconfiguring the connection of circuit cells in the LSI circuit or the setting thereof may be used.

When a circuit integration technique capable of replacing LSI appears with the progress of semiconductor technology or other technologies derived from the semiconductor technology, the technique may be used to integrate the functional blocks. For example, biotechnology can be applied.

Although the present invention has been described in detail and with reference to specific embodiments, diverse modifications or corrections may be made by those of skilled in the art without departing from the spirit and scope of the present invention.

This application is based on Japanese Patent Application (Japanese Patent Application No. 2010-064928) filed on Mar. 19, 2010, the disclosure of which is incorporated herein by reference in its entirety.

INDUSTRIAL APPLICABILITY

According to the wireless communication device and the wireless communication method of the invention, in a subframe in which a first other wireless communication device transmits a signal to a second other wireless communication device, a signal can be transmitted to the second other wireless communication device at a transmission power higher than a transmission power value in a second subframe in which the first other wireless communication device receives a signal from a third other wireless communication device connected to the first other wireless communication device, and reception quality in the second other wireless communication device can be improved. Therefore, the invention is useful as a wireless communication terminal device and the like.

REFERENCE SIGNS LIST 100, 500, 800, 900: wireless communication terminal device
111: transmission power value setting unit
119: transmission power value switching control unit
200, 400, 700: base station device
203: control signal generation unit
401: transmission power value determination unit
501: path-loss measurement unit
703: control signal generation unit
809: control information extraction unit
812: backhaul timing bitmap storage unit
819: transmission power value switching control unit
905: signal separation unit
909: control information extraction unit
912: backhaul subframe detection unit
919: transmission power value switching control unit

The invention claimed is:

1. A terminal in the form of a wireless communication apparatus comprising:
a reception unit configured to receive a signal from a relay node provided in the form of a first wireless communication device or from a base station provided in the form of a second wireless communication device, the base station being connected to the terminal via a first access link and to the relay node via a backhaul link;
a transmission unit configured to transmit an uplink signal to the base station at a specified transmission power via the first access link;
a transmission power value setting unit configured to set a transmission power value in a first subframe to be higher than a transmission power value in a second subframe, the first subframe being a subframe in which the relay node transmits a backhaul signal to the base station via the backhaul link and the second subframe being a subframe in which the relay node receives an access signal from a relay cell terminal provided in the form of a third wireless communication device, said relay cell terminal being connected to the relay node via a second access link; and
a transmission power value switching control unit configured to switch the specified transmission power used by the transmission unit based on the transmission power value set in the transmission power value setting unit.

2. The terminal according to claim 1,
wherein the transmission power value setting unit sets a first transmission power value having a value higher than the transmission power value in the second subframe and sets a second transmission power value having a value of the transmission power in the second subframe, and
the transmission power value switching control unit switches to the first transmission power value in the first subframe and switches to the second transmission power value in a subframe other than the first subframe.

3. The terminal according to claim 2,
wherein the reception unit receives an indicator from the base station, indicating a timing of the first subframe, and
the transmission power value switching control unit switches to the first transmission power value in the first subframe and switches to the second transmission power value in a subframe other than the first subframe, based on the indicator.

4. The terminal according to claim 1,
wherein the transmission power value switching control unit switches to the first transmission power value in the first subframe if a distance between the first wireless communication device and the wireless communication apparatus is less than a predetermined distance.

5. The terminal according to claim 4, further comprising:
a path-loss measurement unit configured to measure a path-loss between the base station and the terminal based on 1) a reference signal transmitted from the base station and 2) a path-loss between the relay node and the terminal based on a reference signal transmitted from the relay node;
wherein the transmission unit is configured to transmit the measurement result of the path-loss measurement unit to the base station,
wherein, if the reception unit receives, from the base station, a determination result determined by the base station that the distance between the relay node and the terminal is less than the predetermined distance based on the measurement result of the path-loss measurement unit, the transmission power value switching control unit switches to the first transmission power value in the first subframe and switches to the second transmission power value in a subframe other than the first subframe.

6. The terminal according to claim 2,
wherein the reception unit receives a bitmap indicating the timing of the first subframe from the second wireless communication device, and
the transmission power value switching control unit switches to the first transmission power value in the first subframe and switching to the second transmission power value in a subframe other than the first subframe on the basis of the bitmap.

7. The terminal according to claim 2, further comprising:
a subframe detection unit configured to detect the first subframe,
wherein the transmission power value switching control unit switches to the first transmission power value in the first subframe and switches to the second transmission power value in a subframe other than the first subframe based on the detection result of the subframe detection unit.

8. The terminal according to claim 1,
wherein the first wireless communication device is a Relay Node (RN), the second wireless communication device is a base station device, and the third wireless communication device is a wireless communication terminal device connected to the RN.

9. The terminal according to claim 2,
wherein the transmission power value switching control unit switches to the first transmission power value in the first subframe if a distance between the first wireless communication device and the wireless communication apparatus is less than a predetermined distance.

10. The terminal according to claim 3,
wherein the transmission power value switching control unit switches to the first transmission power value in the first subframe if a distance between the relay node and the terminal is less than a predetermined distance.

11. The terminal of claim 1, said terminal being configured to receive an indicator from the base station, said indicator indicating a timing of the first subframe during which the relay node transmits the backhaul signal to the base station via the backhaul link.

12. A wireless communication method of a terminal, the wireless communication method comprising:
receiving a signal from a relay node or a base station, the base station being connected to the terminal via a first access link and to the relay node via a backhaul link;
setting a transmission power value in a first subframe to be higher than a transmission power value in a second subframe, the first subframe being a subframe in which the relay node transmits a signal to the base station via the backhaul link and the second subframe being a subframe in which the relay node receives a signal from a relay cell terminal connected to the relay node via a second access link; and
switching the transmission power in the first subframe to be higher than the transmission power value in the second subframe based on setting the transmission power value in the first subframe.

* * * * *